US012786173B2

(12) United States Patent
Ueki et al.

(10) Patent No.: US 12,786,173 B2
(45) Date of Patent: Nov. 3, 2026

(54) INFORMATION SHARING SYSTEM, INFORMATION SHARING METHOD, AND ANALYSIS DEVICE

(71) Applicant: Hitachi, Ltd., Tokyo (JP)

(72) Inventors: Yuki Ueki, Tokyo (JP); Tomohiro Shigemoto, Tokyo (JP); Nobutaka Kawaguchi, Tokyo (JP); Katsuya Nishijima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 18/720,219

(22) PCT Filed: Dec. 28, 2021

(86) PCT No.: PCT/JP2021/048972
§ 371 (c)(1),
(2) Date: Jun. 14, 2024

(87) PCT Pub. No.: WO2023/127153
PCT Pub. Date: Jul. 6, 2023

(65) Prior Publication Data
US 2025/0055836 A1 Feb. 13, 2025

(51) Int. Cl.
*H04L 9/40* (2022.01)

(52) U.S. Cl.
CPC ................................ *H04L 63/0428* (2013.01)

(58) Field of Classification Search
CPC ............................. H04L 63/0428; G06F 21/62
USPC ............................................................... 726/4
See application file for complete search history.

(56) References Cited

U.S. PATENT DOCUMENTS 7,188,358 B1 * 3/2007 Hisada .................. H04L 51/212 709/224
2003/0028768 A1 * 2/2003 Leon ................... H04L 63/0815 713/180
2008/0155644 A1 * 6/2008 Baranov ............. H04W 12/108 726/1

(Continued)

FOREIGN PATENT DOCUMENTS

| | | |
|---|---|---|
| JP | 2014-095931 A | 5/2014 |
| JP | 2020-092748 A | 6/2020 |
| JP | 2021-018587 A | 2/2021 |

OTHER PUBLICATIONS

International Search Report of PCT/JP2021/048972 dated Mar. 22, 2022.

(Continued)

*Primary Examiner* — Amare F Tabor
(74) *Attorney, Agent, or Firm* — Volpe Koenig

(57) ABSTRACT

Disclosed is an information sharing system that includes a concealment processing section, an analysis section, and an information transmission section. The concealment processing section conceals information collected from any one or more of multiple organizations in accordance with the level of credibility between the organizations. The analysis section makes an analysis by using the information concealed by the concealment processing section and an analysis logic collected from any one or more of the multiple organizations. The information transmission section transmits the result of analysis by the analysis section to any one or more of the multiple organizations, and allows each organization to share the result of analysis.

15 Claims, 18 Drawing Sheets

1

(56) References Cited

U.S. PATENT DOCUMENTS

| | | | | |
|---|---|---|---|---|
| 2014/0245000 | A1* | 8/2014 | Byrum | H04L 63/0428 713/156 |
| 2014/0344571 | A1* | 11/2014 | Adam | G06F 21/6218 713/165 |
| 2015/0180839 | A1* | 6/2015 | Moffat | H04L 9/0822 713/150 |
| 2015/0278451 | A1* | 10/2015 | Kitano | G06F 16/955 726/27 |
| 2016/0149875 | A1* | 5/2016 | Li | H04L 63/08 713/168 |
| 2018/0359232 | A1* | 12/2018 | Sander | G06F 21/6218 |

OTHER PUBLICATIONS

Nishijima, Katsuya, "Proposal of autonomous evolution-type defense system using connection tendencies of multiple organizations" IPSJ SIG Technical Report computer security, vol. 2021-CSEC-92, No. 19, Mar. 8, 2021, pp. 1-8.

Yoshino, Masayuki. k-Anonymization Technique over Encrypted Database, Proceedings of Multimedia, Distributed, Cooperative, and Mobile (DICOMO 2018) Symposium series. IPSJ symposium series, vol. 2018, No. 1, Jun. 27, 2018, pp. 452-459.

* cited by examiner

FIG. 4

CONCEALMENT POLICY

132

| ID (401) | TYPE OF SHARED INFORMATION (402) | MEDIUM CREDIBILITY THRESHOLD (403) | HIGH CREDIBILITY THRESHOLD (404) |
|---|---|---|---|
| 1 | INCIDENT HANDLING INFORMATION | 0.3 | 0.5 |
| 2 | ACCESS LOG | 0.5 | 0.7 |
| ⋮ | ⋮ | ⋮ | ⋮ |

FIG. 5

LOGIC INFORMATION TABLE

181

| ID (501) | LOGIC NAME (502) | NAME OF OWNING ORGANIZATION (503) | DETAILS OF LOGIC ANALYSIS (504) | LEVEL OF CONCEALMENT OF NECESSARY INFORMATION (505) | INFORMATION NECESSARY FOR ANALYSIS (506) |
|---|---|---|---|---|---|
| 1 | LOGIC A | ORGANIZATION A | EXPLANATION A | HIGH | IP ADDRESS, ACCESS LOG |
| 2 | LOGIC B | ORGANIZATION C | EXPLANATION B | LOW | IP ADDRESS |
| ⋮ | ⋮ | ⋮ | ⋮ | ⋮ | ⋮ |

FIG. 6

ORGANIZATION INFORMATION TABLE

182

601 602 603 604 605 606 607

| ID | ORGANIZATION NAME | CONNECTION DESTINATION IP | SECURITY | ELECTRICITY | FINANCE | ... |
|---|---|---|---|---|---|---|
| 1 | ORGANIZATION A | XXX.XXX.XX.XX | 1 | 1 | 0 | ... |
| 2 | ORGANIZATION B | XXX.XXX.XX.XX | 0 | 0 | 1 | ... |
| ⋮ | ⋮ | ⋮ | ⋮ | ⋮ | ⋮ | ⋮ |

FIG. 7

CREDIT SCORE TABLE

183

| EVALUATION DESTINATION ORGANIZATION / EVALUATION SOURCE ORGANIZATION | ORGANIZATION A | ORGANIZATION B | ORGANIZATION C | ... |
|---|---|---|---|---|
| ORGANIZATION A | | 6.6 | 8.8 | ... |
| ORGANIZATION B | 13.2 | | 5.5 | ... |
| ORGANIZATION C | 0.4 | 8.8 | | ... |
| ⋮ | ⋮ | ⋮ | ⋮ | |

702

701

FIG. 8

184

CREDIBILITY TABLE

| EVALUATION SOURCE ORGANIZATION \ EVALUATION DESTINATION ORGANIZATION | ORGANIZATION A | ORGANIZATION B | ORGANIZATION C | ... |
|---|---|---|---|---|
| ORGANIZATION A | | 0.3 | 0.4 | ... |
| ORGANIZATION B | 0.6 | | 0.25 | ... |
| ORGANIZATION C | 0.2 | 0.4 | | ... |
| ⋮ | ⋮ | ⋮ | ⋮ | |

802

801

FIG. 9

185

CONCEALMENT DEFINITION TABLE

| SHARED INFORMATION \ CREDIBILITY | LOW CREDIBILITY | MEDIUM CREDIBILITY | HIGH CREDIBILITY |
|---|---|---|---|
| INCIDENT HANDLING INFORMATION | UNSHARED | CONCEALED DATA SUCH AS TOOL INFORMATION | RAW DATA |
| SPECIMEN ANALYSIS INFORMATION | UNSHARED | CONCEALED DATA SUCH AS ORGANIZATIONAL OR PERSONAL INFORMATION | RAW DATA AND SPECIMEN |
| LOG | UNSHARED | ONLY DETERMINATION RESULTS ARE SHARED | POSSIBLY RELATED INFORMATION ARE ALSO SHARED |
| BLACKLIST/WHITELIST | UNSHARED | ONLY DETERMINATION RESULTS ARE SHARED | ONLY DETERMINATION RESULTS ARE SHARED |
| PUBLIC INFORMATION | SHARED | SHARED | SHARED |

902

901

ANALYSIS REQUEST SCREEN

1301

| ID | LOGIC NAME | NAME OF OWNING ORGANIZATION | DETAILS OF LOGIC ANALYSIS | LEVEL OF CONCEALMENT OF NECESSARY INFORMATION | INFORMATION NECESSARY FOR ANALYSIS |
|---|---|---|---|---|---|
| 1 | LOGIC A | ORGANIZATION A | EXPLANATION A | HIGH | IP ADDRESS, ACCESS LOG |
| 2 | LOGIC B | ORGANIZATION C | EXPLANATION B | LOW | IP ADDRESS |
| ⋮ | ⋮ | ⋮ | ⋮ | ⋮ | ⋮ |

ANALYSIS RESULT DISPLAY SCREEN

FIG. 15

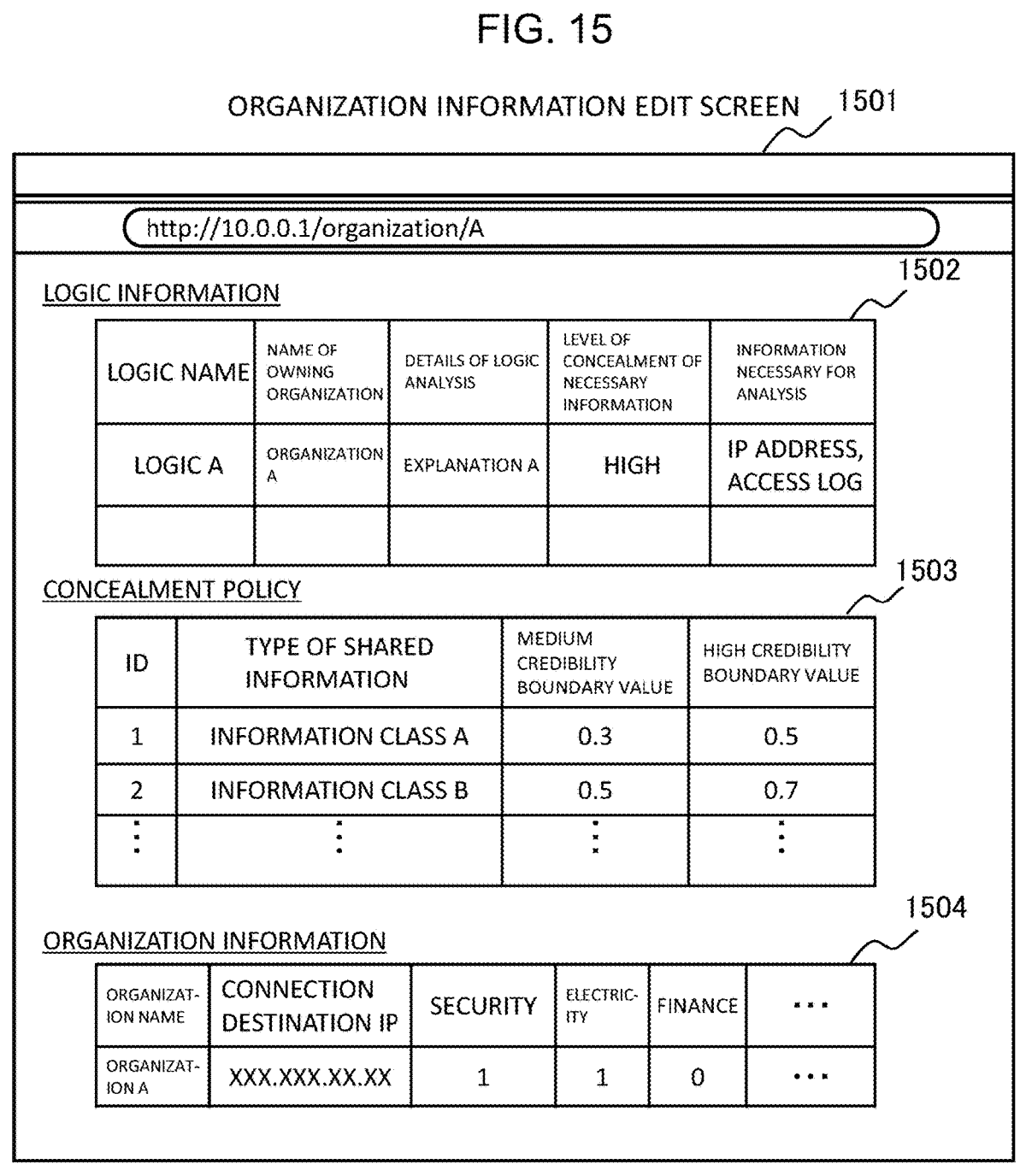

ORGANIZATION INFORMATION EDIT SCREEN 1501 http://10.0.0.1/organization/A

LOGIC INFORMATION

1502

| LOGIC NAME | NAME OF OWNING ORGANIZATION | DETAILS OF LOGIC ANALYSIS | LEVEL OF CONCEALMENT OF NECESSARY INFORMATION | INFORMATION NECESSARY FOR ANALYSIS |
|---|---|---|---|---|
| LOGIC A | ORGANIZATION A | EXPLANATION A | HIGH | IP ADDRESS, ACCESS LOG |
| | | | | |

CONCEALMENT POLICY

1503

| ID | TYPE OF SHARED INFORMATION | MEDIUM CREDIBILITY BOUNDARY VALUE | HIGH CREDIBILITY BOUNDARY VALUE |
|---|---|---|---|
| 1 | INFORMATION CLASS A | 0.3 | 0.5 |
| 2 | INFORMATION CLASS B | 0.5 | 0.7 |
| ⋮ | ⋮ | ⋮ | ⋮ |

ORGANIZATION INFORMATION

1504

| ORGANIZAT-ION NAME | CONNECTION DESTINATION IP | SECURITY | ELECTRIC-ITY | FINANCE | ... |
|---|---|---|---|---|---|
| ORGANIZAT-ION A | XXX.XXX.XX.XX | 1 | 1 | 0 | ... |

INFORMATION SHARING SYSTEM, INFORMATION SHARING METHOD, AND ANALYSIS DEVICE

TECHNICAL FIELD

The present invention relates to a system, method, and device for sharing information between multiple organizations.

BACKGROUND ART

In the past, it was common in the field of information processing that information was processed individually by organizations through the use of various information owned by the individual organizations. However, there are limits to various processes and countermeasures that are based on the use of information owned by a single organization. Therefore, in recent years, the use of systems sharing information between multiple organizations has been promoted in order to obtain more beneficial effects.

For example, in the field of cybersecurity, cyberattacks by attackers are becoming more diverse and sophisticated, and it is difficult to adequately thwart the threat of cyberattacks by using only the information owned by the individual organizations. Therefore, as a countermeasure against cyberattacks, cyberattack information owned individually by multiple organizations is shared and used by the multiple organizations to improve the security systems of the individual organizations. In fact, public organizations, such as IPA (Information-technology Promotion Agency, Japan) and ISAC (Information Sharing and Analysis Center), are making efforts to share information between multiple organizations.

The efforts are being made to share information as described above. Meanwhile, there is a risk of leakage of shared information, and the shared information may possibly include sensitive information of individual organizations. Consequently, problems may arise to impede the promotion of information sharing. Accordingly, a technology for evaluating the credibility of information sharing partners and sharing the information based on the evaluated credibility has been proposed to address the above problems.

For example, the technology disclosed in Patent Literature 1 below is known regarding transactions using the level of credibility (credit score) through the Internet. In order to promote the transactions of transaction objects through the Internet, the technology disclosed in Patent Literature 1 acquires a credit score based on the behavior of a seller who sells a transaction object on the Internet. In a case where the acquired credit score of the seller satisfies predetermined conditions, the disclosed technology pays the whole or part of the selling price of the transaction object to the seller during the time interval between the instant at which the transaction object is put on sale and the instant at which the purchaser of the transaction object registers the receipt of the transaction object.

CITATION LIST

Patent Literature

Patent Literature 1: JP-2021-18587-A

SUMMARY OF THE INVENTION

Problem to be Solved by the Invention

The technology described in Patent Literature 1 promotes transactions by acquiring the seller's credit score and providing the whole or part of the selling price of the transaction object only when the acquired credit score satisfies the predetermined conditions. However, Patent Literature 1 only assumes one-to-one transactions, and does not assume transactions between a single organization and multiple organizations. Therefore, the technology described in Patent Literature 1 is not applicable in a situation where information is shared with multiple organizations.

The present invention has been made in view of the above circumstances. An object of the present invention is to provide a technology that makes it possible to share information with multiple organizations in accordance with credibility.

Means for Solving the Problem

According to an aspect of the present invention, there is provided an information sharing system including a concealment processing section, an analysis section, and an information transmission section. The concealment processing section conceals information collected from any one or more of multiple organizations in accordance with a level of credibility between the organizations. The analysis section makes an analysis by using the information concealed by the concealment processing section and an analysis logic collected from any one or more of the multiple organizations. The information transmission section transmits a result of analysis by the analysis section to any one or more of the multiple organizations, and allows each organization to share the result of analysis.

According to another aspect of the present invention, there is provided an information sharing method including: collecting information from any one or more of multiple organizations; concealing the collected information in accordance with the level of credibility between the organizations; causing a computer to make an analysis by using the concealed information and an analysis logic collected from any one or more of the multiple organizations; and transmitting a result of analysis to any one or more of the multiple organizations and allowing each organization to share the result of analysis.

According to yet another aspect of the present invention, there is provided an analysis device including an analysis section and an information transmission section. The analysis section makes an analysis by using an analysis logic collected from any one or more of multiple organizations and information of any one or more of the multiple organizations that is concealed in accordance with a level of credibility between the organizations. The information transmission section transmits a result of analysis by the analysis section to any one or more of the multiple organizations, and allows each organization to share the result of analysis.

At least one implementation of a subject matter disclosed herein will be described in detail in the accompanying drawings and in the rest of this document. Other features, aspects, and advantages of the disclosed subject matter will become apparent from the following disclosure, drawings, and appended claims.

Advantages of the Invention

The present invention provides a technology that is able to achieve information sharing based on credibility between multiple organizations.

BRIEF DESCRIPTION OF THE DRAWINGS

FIG. 4 is a diagram illustrating an example of the data structure of a concealment policy.

FIG. 5 is a diagram illustrating an example of the data structure of a logic information table.

FIG. 6 is a diagram illustrating an example of the data structure of an organization information table.

FIG. 7 is a diagram illustrating an example of the data structure of a credit score table.

FIG. 8 is a diagram illustrating an example of the data structure of a credibility table.

FIG. 9 is a diagram illustrating an example of the data structure of a concealment definition table.

FIG. 15 is a diagram illustrating an example of an organization information edit screen.

MODES FOR CARRYING OUT THE INVENTION

Embodiments of the present invention will now be described in detail with reference to the accompanying drawings. As a general rule, the embodiments are explained in such a manner that the same component elements are designated by the same reference signs and will not be redundantly described. It should be noted that the embodiments are merely examples for implementing the present invention, and not intended to limit the technical scope of the present invention.

First Embodiment

An information sharing system according to a first embodiment of the present invention is described below with reference to FIGS. 1 to 15. In a case where information is shared by multiple organizations (e.g., companies, offices, and schools) interconnected through a network, the information sharing system according to the first embodiment uses an analysis device to conceal and analyze information collected from any one or more of the multiple organizations, allows each organization to share the result of analysis, and thus realizes secure information sharing between the multiple organizations.

The following embodiments are described with reference to an example in which the functions of the information sharing system provided by the present invention are implemented by causing a computer to execute a program. Alternatively, however, similar functions may be implemented by hardware logic. Further, the program to be executed may be stored in advance in the computer, or may be introduced into the computer through a network from an external device equipped with a non-transitory storage medium or through a portable non-transitory storage medium.

Figure 1:
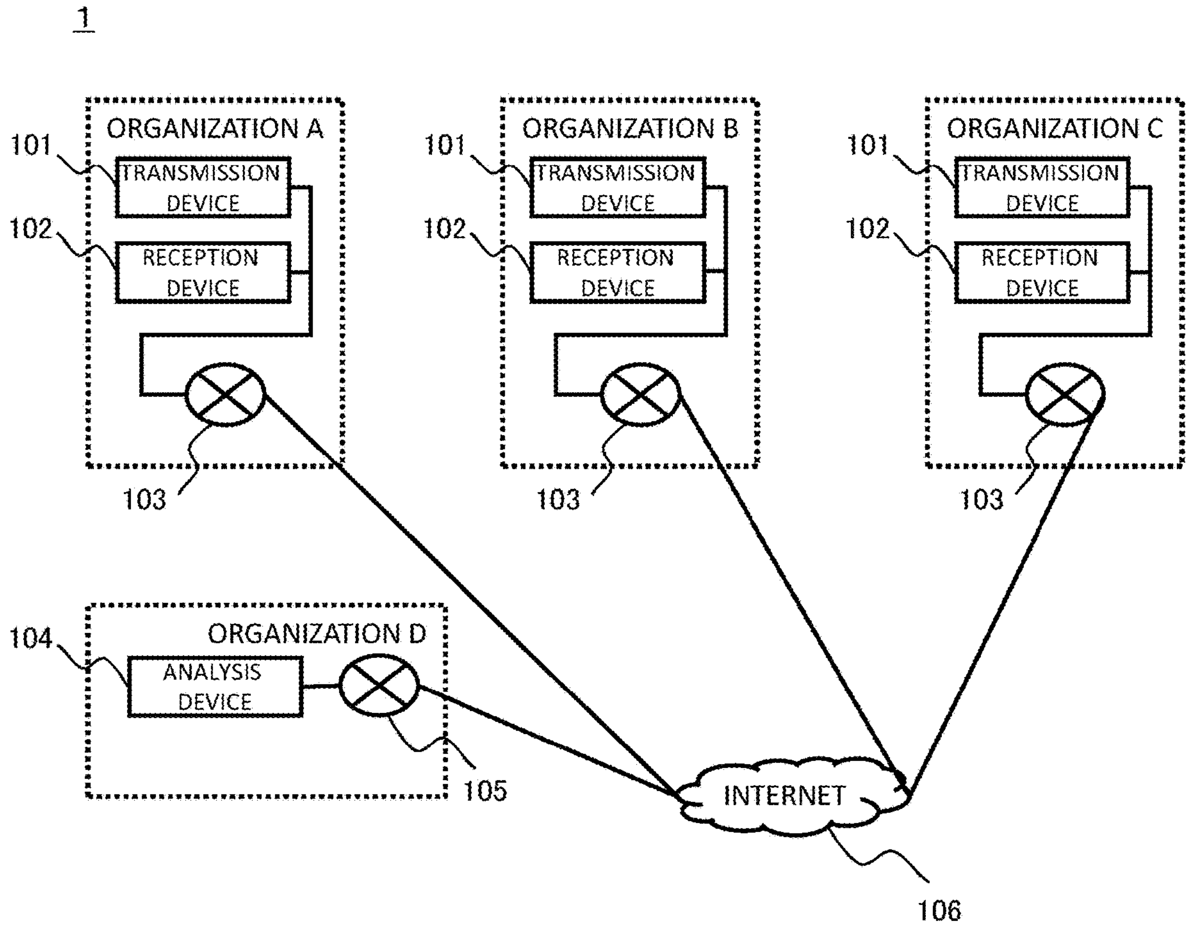
FIG. 1 is a diagram illustrating an example of the overall configuration of an information sharing system according to a first embodiment of the present invention.

FIG. 1 is a diagram illustrating an overall configuration of the information sharing system 1 according to the first embodiment of the present invention. The information sharing system 1 depicted in FIG. 1 is configured such that multiple organizations, each of which is equipped with a transmission device 101 and a reception device 102, and an organization equipped with an analysis device 104 are connected to the Internet 106 through networks 103 and 105. The networks 103 and 105 may be, for example, wired or wireless LANs (Local Area Networks) or global networks. Further, the Internet 106, which is a type of global network for relaying communications between the organizations, may use any communication method.

The transmission device 101, which is owned by each of organizations A, B, and C, transmits, to the analysis device 104, which is owned by organization D, information owned by each organization and required for analysis (hereinafter referred to as the analysis information) and information indicating the level of credibility between the organizations, and then requests the analysis device 104 to make an analysis. Meanwhile, the reception device 102, which is owned by each of the organizations A, B, and C, receives an analysis result transmitted from the analysis device 104. In response to an analysis request from any one of the organizations A, B, and C, the analysis device 104 collects the analysis information transmitted from the transmission device 101 of each organization, and conceals and analyzes the collected analysis information. The result of analysis by the analysis device 104 is transmitted from the organization D to each of the organizations A, B, and C, and received by the reception device 102 of each organization. As a result, the information sharing system 1 according to the present embodiment provides information sharing between the multiple organizations.

Although the example depicted in FIG. 1 indicates that organizations A to C each own the transmission device 101 and the reception device 102, and that the organization D owns the analysis device 104, there are no rules regarding the number of organizations forming the information sharing system 1 and the combination of devices owned by each organization. The information sharing system 1 may have any configuration as long as it is formed by multiple organizations and equipped with at least one analysis device that collects the analysis information from any one or more of the multiple organizations and makes an analysis.

Figure 2:
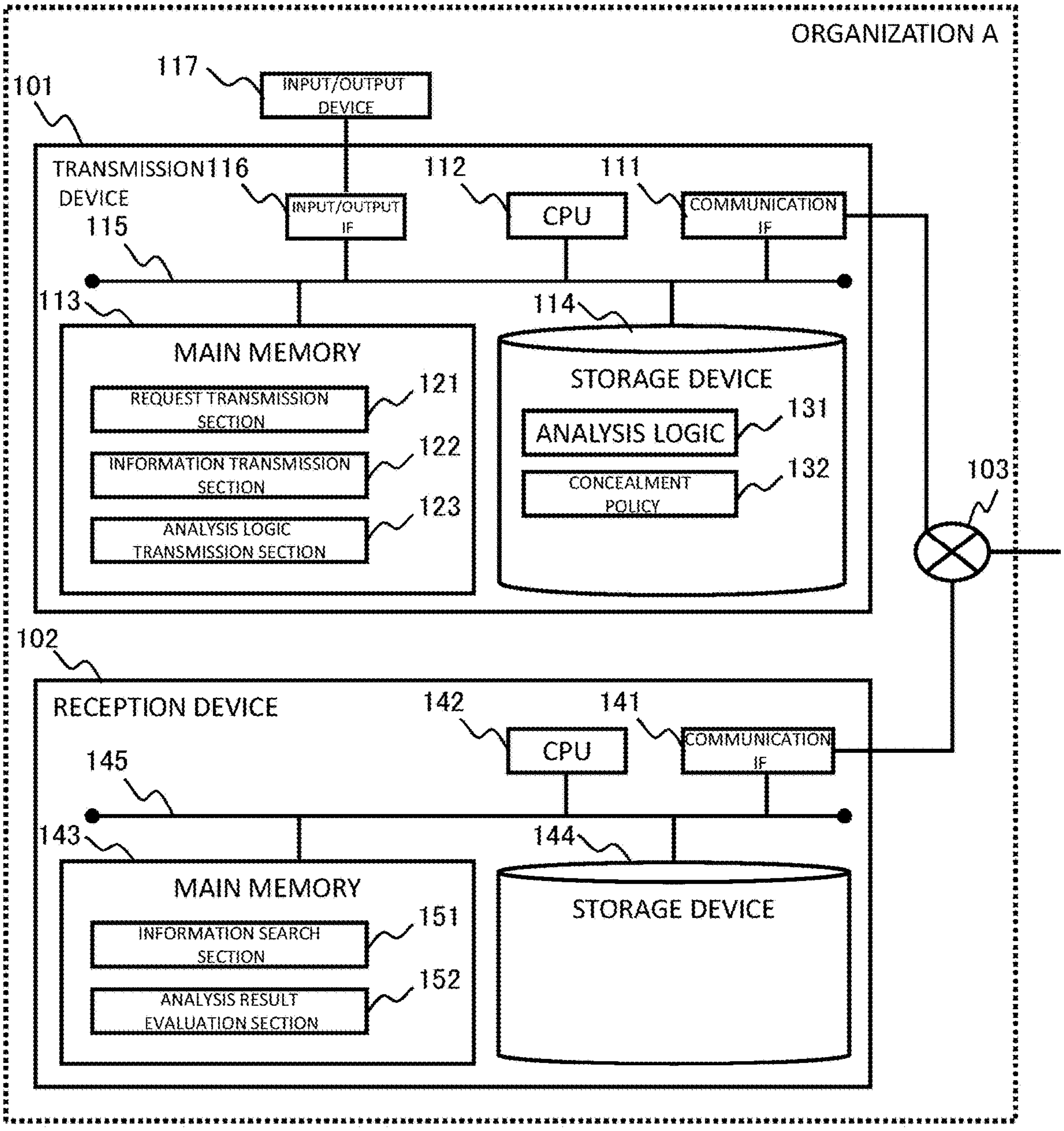
FIG. 2 is a diagram illustrating an example of the configuration of a transmission device and an example of the configuration of a reception device.

The transmission device 101 and the reception device 102 will now be described with reference to FIG. 2. FIG. 2 is a diagram illustrating a configuration of the transmission device 101 and a configuration of the reception device 102. FIG. 2 illustrates the configurations of the transmission device 101 and reception device 102 of the organization A. Meanwhile, the configurations of the transmission device 101 and reception device 102 of the organizations B and C are also similar to those depicted in FIG. 2.

The transmission device 101 is implemented by using a general information processing device such as a PC (Personal Computer). As depicted in FIG. 2, the transmission device 101 includes a communication interface (communication IF) 111, a CPU (Central Processing Unit) 112, a main memory 113, a storage device 114, an input/output interface (input/output IF) 116, and a communication channel 115 that connects these component elements. The communication channel 115 is, for example, an information transmission medium such as a bus or a cable.

The communication IF 111 operates under the control of the CPU 112, and performs interface processing on various information transmitted and received between the transmission device 101, the reception device 102, and the analysis device 104.

An input/output device 117 is a device that receives input from an administrator in charge of managing the information sharing system 1 in the organization A and outputs information to be presented to the administrator. The input/output device 117 includes, for example, a mouse, a keyboard, and a display. The input/output IF 116 is connected to the input/output device 117, and configured to mediate data input and output that are performed by the input/output device 117 with respect to the administrator.

The main memory 113 is, for example, a RAM (Random Access Memory) or other semiconductor storage device, and configured to temporarily store necessary work data and a program that is to be executed by the CPU 112 after being loaded from the storage device 114.

The CPU 112 executes a program stored in the main memory 113 to control various sections of the transmission device 101.

The storage device 114 is, for example, a large-capacity, non-transitory magnetic storage device or a semiconductor storage device, such as a HDD (Hard Disk Drive) or an SSD (Solid State Drive), and configured to store a program to be executed by the CPU 112 and data to be used by the CPU 112. The whole or part of the program and data may be stored in advance in the storage device 114 as mentioned above, or may be introduced as needed from the outside.

In the present embodiment, functional blocks, namely, a request transmission section 121, an information transmission section 122, and an analysis logic transmission section 123, are implemented in the transmission device 101 when a predetermined program is loaded into the main memory 113 from the storage device 114 and executed by the CPU 112. Further, as the data to be used in the processing of these functional blocks, the storage device 114 stores an analysis logic 131 and a concealment policy 132.

The request transmission section 121 generates an analysis request to the analysis device 104, and outputs the generated analysis request to the communication IF 111. The analysis request contains analysis information of the organization A, information for identifying the analysis logic for use in analysis, and the concealment policy 132 of the organization A, which is read from the storage device 114, and is transmitted from the communication IF 111 to the analysis device 104 through the network 103. Further, in a case where the organization A requires analysis logic information for determining the details of analysis, the request transmission section 121 can output a request to transmit the analysis logic information stored in the analysis device 104 to the communication IF 111. The request to transmit the analysis logic information, which is outputted from the request transmission section 121, is transmitted from the communication IF 111 to the analysis device 104 through the network 103.

When the reception device 102 receives a request to share analysis information necessary for analysis in the analysis device 104, the information transmission section 122 acquires the analysis information relevant to the request from the reception device 102, and outputs the acquired analysis information to the communication IF 111. The analysis information outputted from the information transmission section 122 is transmitted from the communication IF 111 to the analysis device 104 through the network 103, and used for an analysis process that is performed by the analysis device 104.

When the reception device 102 receives a request to transmit the analysis logic 131 from the analysis device 104, the analysis logic transmission section 123 responds to the request and outputs the analysis logic 131 stored in the storage device 114 to the communication IF 111. The analysis logic 131 outputted to the communication IF 111 is transmitted to the analysis device 104 through the network 103.

The analysis logic 131 is a program that is owned by the organization A and used for making an analysis. The contents of the analysis logic 131 vary from one organization to another.

The concealment policy 132 is information that is used to define the level of information concealment in each organization when the result of analysis by the analysis device 104 is shared by each organization. The concealment policy 132 will be described in detail later.

As is the case with the transmission device 101, the reception device 102 is implemented by a general information processing device such as a PC. As depicted in FIG. 2, the reception device 102 includes a communication IF 141, a CPU 142, a main memory 143, a storage device 144, and a communication channel 145 that connects these component elements. The functions of these component elements are similar to those of the communication IF 111, the CPU 112, the main memory 113, the storage device 114, and the communication channel 115 in the transmission device 101.

In the present embodiment, functional blocks, namely, an information search section 151 and an analysis result evaluation section 152, are implemented in the reception device 102 when a predetermined program is loaded into the main memory 143 and executed by the CPU 142.

When the transmission device 101 generates an analysis request or when a request to share information is received from the analysis device 104, the information search section 151 searches various information owned by the organization A and stored outside the reception device 102, and retrieves the analysis information necessary for analysis performed in the analysis device 104. The analysis information retrieved by the information search section 151 is outputted from the reception device 102 to the transmission device 101 by the communication IF 141. Then, the information transmission section 122 in the transmission device 101 transmits the analysis information to the analysis device 104 as described above.

The analysis result evaluation section 152 receives the result of analysis, which is transmitted from the analysis device 104, through the communication IF 141, and evaluates the received analysis result. An analysis result evaluation by the analysis result evaluation section 152 will be described in detail later.

Although the example depicted in FIG. 2 indicates that the transmission device 101 and the reception device 102 are configured as separate devices, the transmission device 101 and the reception device 102 may be integrated into a single device. Further, programs executed by the transmission device 101 and the reception device 102 and data used for executing the programs may be stored in a part separate from the transmission device 101 and the reception device 102.

Figure 3:
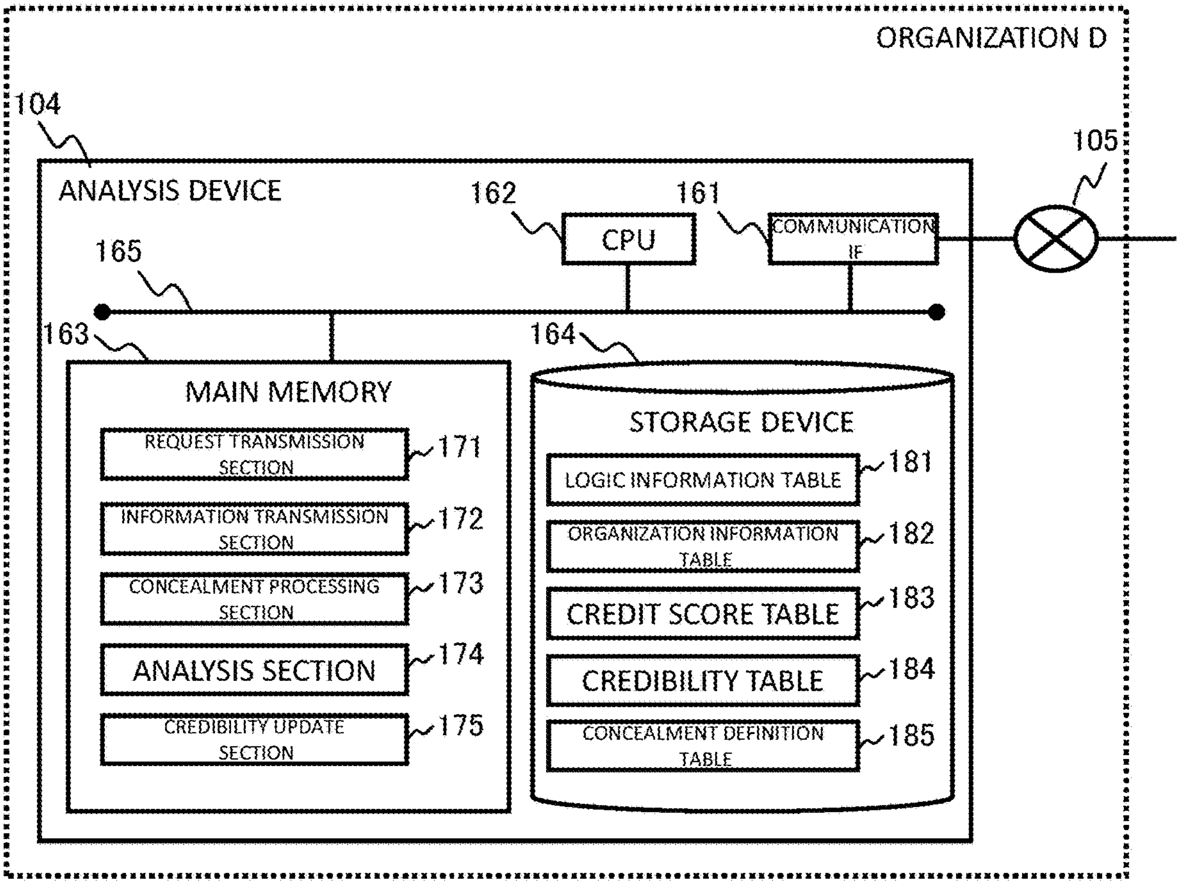
FIG. 3 is a diagram illustrating an example of the configuration of an analysis device.

The analysis device 104 will now be described with reference to FIG. 3. FIG. 3 is a diagram illustrating a configuration of the analysis device 104.

As is the case with the transmission device 101 and reception device 102 depicted in FIG. 2, the analysis device 104 is implemented by a general information processing device such as a PC. As depicted in FIG. 3, the analysis device 104 includes a communication IF 161, a CPU 162, a main memory 163, a storage device 164, and a communication channel 165 that connects these component elements. The functions of these component elements are similar to those of the communication IF 111, the CPU 112, the main memory 113, the storage device 114, and the communication channel 115 in the transmission device 101.

In the present embodiment, functional blocks, namely, a request transmission section 171, an information transmission section 172, a concealment processing section 173, an analysis section 174, and a credibility update section 175, are implemented in the analysis device 104 when a predetermined program is loaded into the main memory 163 and executed by the CPU 162. Further, as the data to be used in the processing of these functional blocks, the storage device 164 stores a logic information table 181, an organization information table 182, a credit score table 183, a credibility table 184, and a concealment definition table 185. These tables will be described in detail later.

When an analysis request is transmitted from the transmission device 101 of any one of the organizations A to C, the request transmission section 171 references the organization information table 182 stored in the storage device 164, checks the organizations A to C to identify an organization having analysis information relevant to the details of a requested analysis, and transmits a request to share the analysis information to the reception device 102 of the identified organization. Further, the request transmission section 171 references the logic information table 181 and organization information table 182 stored in the storage device 164, checks the organizations A to C to identify an organization having the analysis logic 131 necessary for analysis, and transmits a request to transmit the analysis logic 131 to the reception device 102 of the identified organization.

Upon receiving the request to transmit the analysis logic information from the transmission device 101 of any one of the organizations A to C, the information transmission section 172 responds to the received transmission request and transmits the logic information table 181 stored in the storage device 164. Further, the information transmission section 172 transmits the result of analysis performed in response to the analysis request to any one or more of the organizations A to C, and thus allows each organization to share the analysis result.

When an analysis request is transmitted from the transmission device 101 of any one of the organizations A to C, the concealment processing section 173 performs a concealment process on the analysis information and the analysis result, which are collected from each organization, by using the concealment policy 132 contained in the analysis request.

In response to the analysis request from any one of the organizations A to C, the analysis section 174 makes an analysis by using the analysis information collected from each organization. This information analysis is made by using the analysis information of each organization, which is derived from the concealment process performed by the concealment processing section 173, and the analysis logic 131, which is acquired from any one of the organizations in response to the transmission request from the request transmission section 171.

The credibility update section 175 updates the contents of the credit score table 183 and credibility table 184 stored in the storage device 164, by using the analysis information, which is collected from the transmission device 101 of each organization, and the result of evaluation that each organization has made on the analysis result shared between the individual organizations. A credibility update process performed by the credibility update section 175 will be described in detail later.

Further, the analysis device 104 may be connected to an input/output device including, for example, a mouse, a keyboard, and a display and provided with an input/output IF configured to input and output data to and from the input/output device, in order to enable an administrator in charge of managing the information sharing system 1 in the organization D to edit the individual tables stored in the storage device 164. Furthermore, the analysis device 104 may be integrated with the transmission device and reception device 102 depicted in FIG. 2, and these devices may be configured as a single device. Moreover, the programs to be executed in the analysis device 104 and the data to be used for executing the programs may be stored at a location apart from the storage device 164 in the analysis device 104 or at a location apart from the analysis device 104.

Data structures used in the information sharing system 1 according to the present embodiment will now be described with reference to FIGS. 4 to 9.

First, an example of the concealment policy will be described with reference to FIG. 4. FIG. 4 is a diagram illustrating an example of the data structure of the concealment policy 132 stored in the storage device 114 of the transmission device 101.

In the information sharing system according to the present embodiment, the level of concealment of information shared between the different organizations varies with credibility between the organizations. The concealment policy 132 is defined in each organization by determining the threshold of the level of concealment for each type of information shared from an own organization to another organization. When performing the concealment process on the analysis information, the analysis device 104 references the concealment policy 132 and determines the level of concealment corresponding to the credibility for each organization with which the information is shared. In the example of FIG. 4, the level of concealment of shared information is classified into three categories, namely, "low credibility," "medium credibility," and "high credibility." Alternatively, however, the number of categories into which the level of concealment is classified may be more or less than three.

Entries of the concealment policy 132 are expressed in various fields, namely, ID 401, type of shared information 402, medium credibility threshold 403, and high credibility threshold 404. The field "ID 401" stores an identifier that uniquely identifies data corresponding to each record of the concealment policy 132. The field "type of shared information 402" stores the name of the type of information that is owned by each organization and shared between the organizations. The field "medium credibility threshold 403" stores the boundary value between "low credibility" and "medium credibility" among the aforementioned categories indicating the level of concealment. Meanwhile, the field "high credibility threshold 404" stores the boundary value between "medium credibility" and "high credibility." The medium credibility threshold 403 and the high credibility threshold 404 may be set manually by the administrator, or may be set automatically based on the contents of the data, such as by setting a higher threshold if, for example, the data includes personal information.

An example of the logic information table will now be described with reference to FIG. 5. FIG. 5 is a diagram illustrating an example of the data structure of the logic information table 181, which is stored in the storage device 164 included in the analysis device 104.

The logic information table 181 is a table that stores information regarding the analysis logic 131 owned by each organization. The organizations making an analysis request to the analysis device 104 are able to determine the analysis logic 131 for use in analysis by acquiring and referencing the logic information table 181 before making the analysis request.

Entries in the logic information table 181 are expressed in various fields, namely, ID 501, logic name 502, name of owning organization 503, details of logic analysis 504, level of concealment of necessary information 505, and information necessary for analysis 506. The field "ID 501" stores an identifier that uniquely identifies data corresponding to each record of the logic information table 181. The field "logic name 502" stores the name of the analysis logic. The field "name of owning organization 503" stores the name of an organization owning the analysis logic 131. The field "details of logic analysis 504" stores an explanation of the details of analysis performed by the analysis logic 131. The field "level of concealment of necessary information 505" stores information indicating the level of concealment of information used for analysis. The field "information necessary for analysis 506" stores the type of analysis information used for analysis.

It should be noted that the logic information table 181 can be edited by an organization owning the relevant analysis logic 131. When the analysis logic 131 is changed in an organization, the organization modifies the contents of the logic information table 181.

An example of the organization information table will now be described with reference to FIG. 6. FIG. 6 is a diagram illustrating an example of the data structure of the organization information table 182, which is stored in the storage device 164 included in the analysis device 104.

The organization information table 182 is a table that records the connection destination of each organization and the types of information owned by each organization. Upon receiving an analysis request from an organization, the analysis device 104 references the information in the organization information table 182, and requests each organization to share the necessary analysis information.

Entries in the organization information table 182 are expressed in various fields, namely, ID 601, organization name 602, connection destination IP 603, security 604, electricity 605, finance 606, and other industry name 607. The field "ID 601" stores an identifier that uniquely identifies data corresponding to each record of the organization information table 182. The field "organization name 602" stores the name of an organization. The field "connection destination IP 603" stores, for example, connection destination IP information as the information indicating the access destination from the analysis device 104 to the reception device 102 of each organization. The fields "security 604," "electricity 605," "finance 606," and "other industry name 607" store the value 1 if the relevant organization owns the information related to these industries, or the value 0 if the relevant organization does not own the information related to these industries. These items of information are used when the analysis device 104 determines an organization that requests the sharing of analysis information. In the example of FIG. 6, the value 1 or 0 is stored in each field depending on the presence or absence of information of the individual organizations. Alternatively, however, any value between 0 and 1 may be stored according to the amount of information owned by each organization. Still alternatively, a Boolean value may be stored.

An example of the credit score table will now be described with reference to FIG. 7. FIG. 7 is a diagram illustrating an example of the data structure of the credit score table 183, which is stored in the storage device 164 included in the analysis device 104.

The credit score table 183 is a table that indicates a credit score representing the level of credibility between the organizations with respect to each combination of the organizations forming the information sharing system 1. The credit score is a score obtained by an organization evaluating the behavior of another organization. In the credit score table 183 depicted in FIG. 7, the names of the individual organizations forming the information sharing system 1 are arranged in row 702 and column 701. The column 701 indicates the name of an organization that is an evaluation source. The row 702 indicates the name of an organization that is an evaluation destination. Each field located at the intersection between the row and the column corresponding to the individual organization names stores the credit score indicating the level of credibility between the relevant organizations. That is to say, each field in the credit score table 183 depicted in FIG. 7 stores a credit score indicating the level of credibility from an organization in the column 701 to an organization in the row 702. For example, the value of the credit score indicating the level of credibility from the organization A to the organization B is 6.6 in FIG. 7. This credit score is a score indicating the level of credibility that is determined when the organization A evaluates the behavior of the organization B.

An example of the credibility table will now be described with reference to FIG. 8. FIG. 8 is a diagram illustrating an example of the data structure of the credibility table 184, which is stored in the storage device 164 included in the analysis device 104.

The credibility table 184 is a table that indicates the level of credibility between the organizations with respect to each combination of the organizations forming the information sharing system. The credibility is determined when the aforementioned credit score, which is indicated in the credit score table 183, is normalized in the range from 0 to 1. In the credibility table 184 depicted in FIG. 8, the names of the individual organizations forming the information sharing system 1 are arranged in row 802 and column 801, as is the case with the credit score table 183 depicted in FIG. 7. The column 801 indicates the name of an organization that is an evaluation source. The row 802 indicates the name of an organization that is an evaluation destination. Each field located at the intersection between the row and the column corresponding to the individual organization names stores the normalized credibility between the relevant organizations. For example, the value of credibility from the organization A to the organization B is 0.3 in FIG. 8.

An example of the concealment definition table will now be described with reference to FIG. 9. FIG. 9 is a diagram illustrating an example of the data structure of the concealment definition table 185, which is stored in the storage device 164 included in the analysis device 104.

The concealment definition table 185 defines how each piece of information shared between the organizations is concealed in the analysis device 104. In the concealment definition table 185 depicted in FIG. 9, shared information is listed in the column 801, and credibility is listed in the row 802. For each combination of these, the details of concealment performed by the analysis device 104 are defined. For example, if the credibility of certain information, such as incident handling information, is low, such information may not be shared between the organizations as the analysis information. In such a case, the analysis device 104 does not conceal the analysis information, and the analysis information will not be used for analysis.

The processing of the information sharing system 1 according to the present embodiment will now be described with reference to FIGS. 10 to 12.

Figure 10:
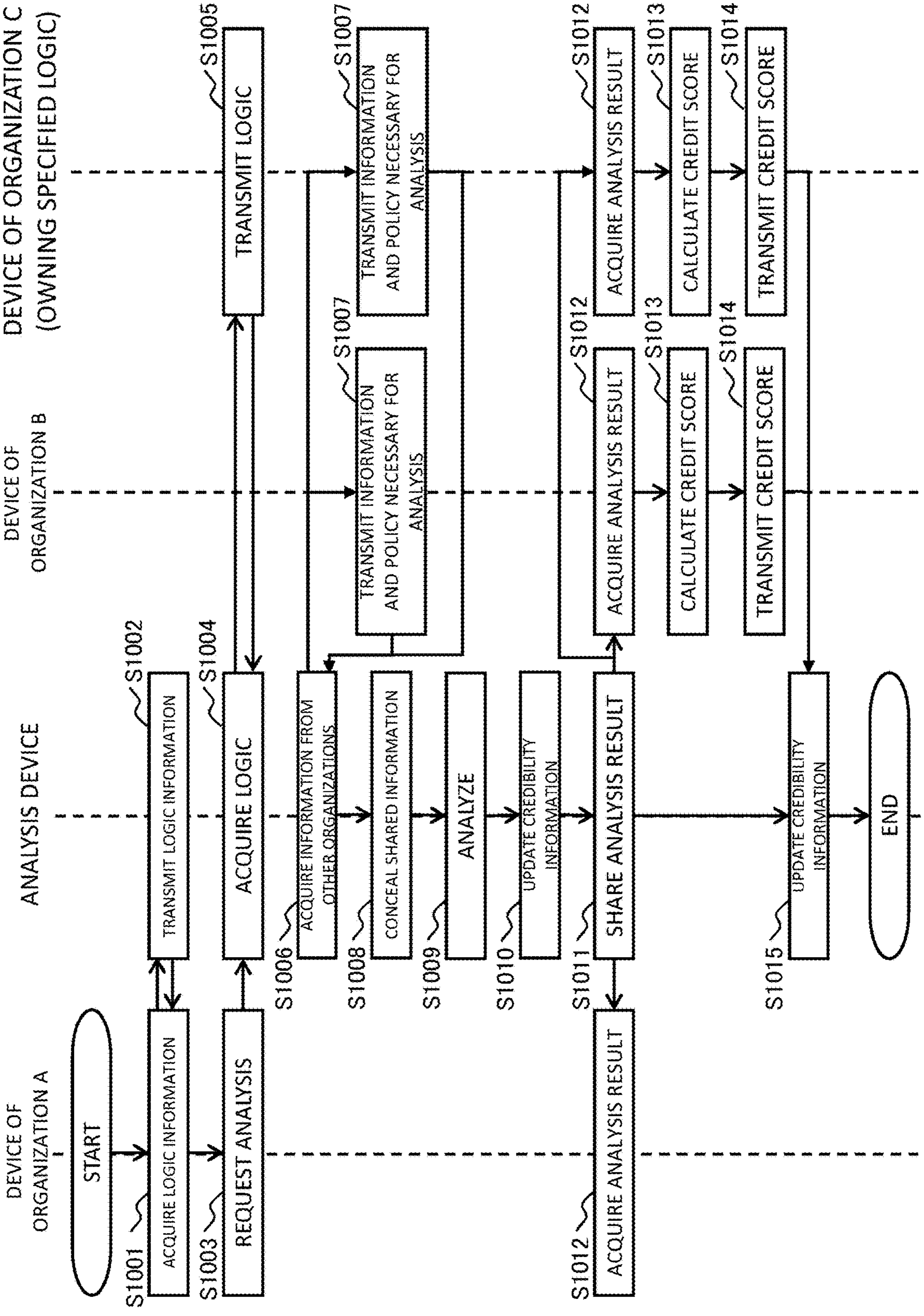
FIG. 10 is a flowchart illustrating an example of the overall process of the information sharing system according to the first embodiment of the present invention.
Figure 11:
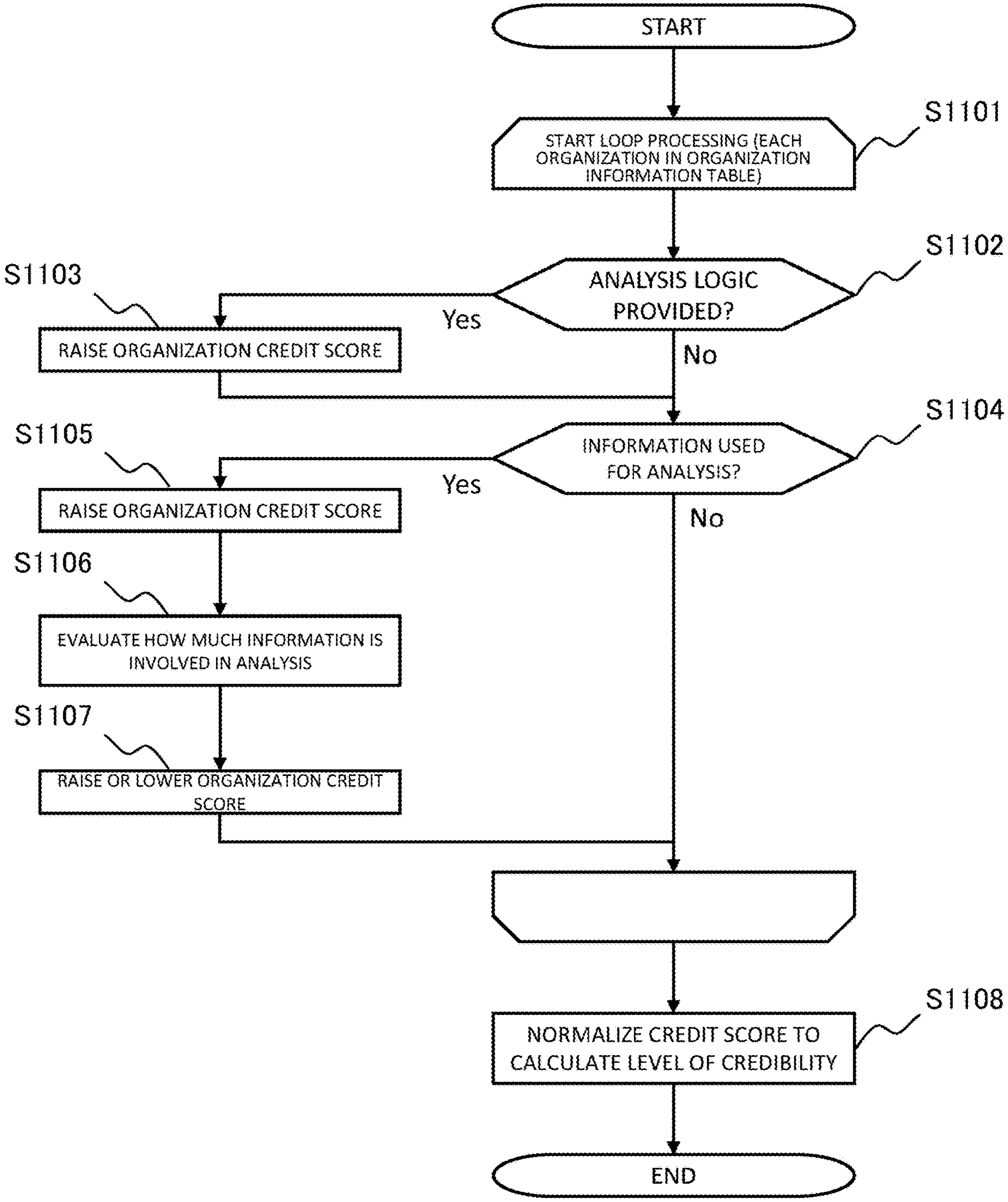
FIG. 11 is a flowchart illustrating an example of a credibility information update process that is performed to update the information indicating the level of credibility from an analysis requesting organization to an information sharing organization.

First, the processing of the information sharing system 1 will be outlined with reference to FIG. 10. FIG. 10 is a flowchart illustrating an overall process of the information sharing system 1 according to the first embodiment of the present invention. Each time an analysis request is made to the analysis device 104 from any one of the organizations A, B, and C, the information sharing system 1 according to the present embodiment performs the overall process depicted in the flowchart of FIG. 10. Although FIG. 10 depicts an example in which the organization A makes an analysis request, the same applies when the organization B or C makes an analysis request.

First, the transmission device 101 owned by the organization A requests logic information from the analysis device 104 (step S1001).

Upon receiving a request for logic information from the transmission device 101 of the organization A, the analysis device 104 causes the information transmission section 172 to transmit the logic information table 181 to the reception device 102 of the organization A (step S1002).

When the reception device 102 of the organization A receives the logic information table 181, the organization A references the logic information listed in the logic information table 181, and determines which executable analysis is to be made by the analysis device 104. After determination, the reception device 102 of the organization A causes the information search section 151 to perform a search on the information owned by the organization A to retrieve analysis information, and outputs the retrieved analysis information to the transmission device 101. The transmission device 101 causes the request transmission section 121 to generate an analysis request by using the analysis information acquired from the reception device 102, the information for identifying the analysis logic 131 for use in analysis, and the concealment policy 132 stored in the storage device 114, and transmits the generated analysis request to the analysis device 104 to make a request for analysis (step S1003).

Upon receiving the analysis request from the transmission device 101 of the organization A, the analysis device 104 causes the request transmission section 171 to extract the information for identifying the analysis logic 131 from the received analysis request, and identifies the analysis logic 131 for use in analysis and the organization owning the identified analysis logic on the basis of the extracted information and the logic information table 181. Then, the analysis device 104 determines the connection destination of the identified organization by using the organization information table 182, and requests the determined connection destination to transmit the analysis logic 131 (step S1004). FIG. 10 depicts an example in which the organization C is requested to transmit the analysis logic 131, and the following description relates to this example. However, the same applies to a case where some other organization is to be requested to transmit the analysis logic 131.

Upon receiving a request to transmit the analysis logic 131 from the analysis device 104, the transmission device 101 of the organization C causes the analysis logic transmission section 123 to transmit the analysis logic 131 stored in the storage device 114 to the analysis device 104 (step S1005).

Upon receiving the analysis logic 131 transmitted from the transmission device 101 of the organization C, the analysis device 104 causes the request transmission section 171 to reference the logic information table 181 and identify the analysis information related to the analysis logic 131. Then, the analysis device 104 references the organization information table 182, determines the organizations owing the identified analysis information and the connection destinations of the determined the organizations, and requests the determined connection destinations to share the analysis information (step S1006). FIG. 10 depicts an example in which the organizations B and C are requested to share the analysis information, and the following description relates to this example. However, the same applies to a case where another organization is to be requested to share the analysis information.

In the organizations B and C, which are requested by the analysis device 104 to share the analysis information, the information search section 151 in the reception device 102 performs a search within the relevant organization to retrieve information related to analysis as the analysis information. Then, the information transmission section 122 in the transmission device 101 of the organizations B and C transmits the analysis information retrieved from the relevant organization and the concealment policy 132 stored in the storage device 114 to the analysis device 104 (step S1007).

Upon receiving the analysis information and the concealment policy 132, which are transmitted from the transmission device 101 of the organizations B and C, the analysis device 104 causes the concealment processing section 173 to perform the concealment process on the analysis information by using not only the received analysis information and concealment policy 132 but also the analysis information and concealment policy 132, which are contained in the analysis request transmitted in step S1003 from the transmission device 101 of the organization A (step S1008). In the concealment process, the analysis information collected from each organization is concealed by excluding analysis information that has been determined to be unshared and not used for analysis due to low credibility of a transmission source organization. The concealment processing performed in step S1008 will be described in detail later.

Next, the analysis device 104 causes the analysis section 174 to perform the analysis requested by the organization A by using the analysis logic 131 acquired in step S1004 from the transmission device 101 of the organization C and the analysis information concealed by the concealment processing in step S1008 (step S1009). For example, in the case of an analysis performed by extracting a suspicious IP address from an access log, if a common IP address of a possibly highly abnormal access destination is found in the access logs of the multiple organizations when the access log information owned in each organization is analyzed as the analysis information, it is determined that the access from such an IP address is likely to be an access from a cyber attacker. In this instance, as mentioned above, the analysis information excluded in the concealment process will not be used for analysis.

Next, the analysis device 104 causes the credibility update section 175 to regard the organization A, which has made an analysis request, as an evaluation source organization, regard the organizations B and C, which have shared the analysis result, as evaluation destination organizations, and perform a credibility information update process of updating the information indicating the level of credibility from the organization A to the organizations B and C (step S1010). The credibility information update process performed in step S1010 will be described in detail later.

Next, the analysis device 104 causes the information transmission section 172 to transmit the analysis result obtained in step S1009 to each organization other than an organization that is determined in step S1008 by the concealment processing section to be not a sharing partner due to low credibility, and allows each organization to share the analysis result (step S1011). In this instance, the analysis device 104 may transmit the analysis result in response to a request from the transmission device 101 owned by each organization instead of compulsorily transmitting the analysis result to each organization. FIG. 10 depicts an example in which the analysis result is transmitted to the organizations A, B, and C and shared between them, and the following description relates to this example. However, the same applies to a case where the analysis result is shared by a different combination of the organizations.

The analysis result transmitted from the analysis device 104 is received by the analysis result evaluation section 152 in the reception device 102 owned by each of the organizations A, B, and C. Consequently, the reception device 102 of each of the organizations A, B, and C acquires the analysis result generated by the analysis device 104 and allows the analysis result to be shared between the organizations A, B, and C (step S1012).

Next, the reception device 102 of each of the organizations B and C causes the analysis result evaluation section 152 to evaluate the analysis result acquired in step S1012 from the analysis device 104, and calculates the credit score indicating the level of credibility from the organizations B and C to the organization A, which has made an analysis request (step S1013). A credit score calculation process performed in step S1013 will be described in detail later.

Next, in the organizations B and C, the reception device 102 outputs the credit score calculated in step S1013 to the transmission device 101, and then the transmission device 101 is used to transmit the credit score to the analysis device 104 (step S1014).

Upon receiving the credit score transmitted from the transmission device 101 of each of the organizations B and C, the analysis device 104 causes the credibility update section 175 to regard the organization A, which has made an analysis request, as the evaluation destination organization, regard the organizations B and C, which have evaluated the analysis result, as evaluation source organizations, and perform a credibility information update process of updating the information indicating the level of credibility from each of the organizations B and C to the organization A (step S1015). The credibility information update process performed in step S1015 will be described in detail later.

When the processing in step S1015 terminates, the process depicted in the flowchart of FIG. 10 ends to conclude the overall process of the information sharing system 1.

The concealment process employed in the information sharing system 1 according to the present embodiment will now be described. The concealment process corresponds to the processing in step S1008 of FIG. 10. The concealment processing section 173, which is loaded into the main memory 163 of the analysis device 104, performs the concealment process by using the analysis information and concealment policy 132, which are transmitted from the transmission device 101 of each organization.

It should be noted that, as described with reference to FIG. 10, the analysis device 104 causes the concealment processing section 173 to perform the concealment process on the analysis information before making an analysis. The reason is that the analysis information may leak to the outside by use of the analysis logic 131 because the analysis logic 131 is a program developed and retained by each organization while the concealment processing section 173 is a program retained in the analysis device 104. Therefore, before making an analysis by using the analysis logic 131, the analysis device 104 conceals the analysis information that is to be used for the analysis. Consequently, even if the analysis logic 131 intentionally or accidentally leaks the analysis information to the outside, the resulting damage can be minimized.

As described earlier, the level of concealment of analysis information in the concealment process varies depending on the level of credibility between the organizations. Specifically, the level of concealment for each organization is determined by comparing the level of credibility between the organizations with a predetermined threshold. The threshold is predetermined by the concealment policy 132 owned by transmission device 101 of each organization for each type of shared analysis information.

In the analysis device 104, the concealment processing section 173 references the concealment policy 132, which is contained in the analysis request transmitted from any one of the organizations in step S1003 of FIG. 10, and the credibility table 184 and concealment definition table 185, which are stored in the storage device 164, and determines the level of concealment of the analysis information shared between the organizations. The level of credibility used in this instance is the credibility from each organization that has provided the analysis information to an organization that has requested the analysis device 104 to make an analysis. Subsequently, a concealment processing program possessed by the concealment processing section 173 is used to perform the concealment process on the analysis information collected from each organization in accordance with the level of concealment.

Specifically, for example, in the flowchart of FIG. 10, the organizations B and C, which have provided the analysis information, are regarded as the evaluation source organizations, and the organization A, which has made an analysis request, is regarded as the evaluation destination organization, and the credibility between these organizations is determined from the credibility table 184. Then, the determined credibility is compared with the threshold indicated in the concealment policy 132 to determine the level of credibility from the organization B to the organization A and the level of credibility from the organization C to the organization A. After the levels of credibility between the organizations are determined in the above manner, the concealment definition table 185 is referenced to determine the details of concealment appropriate for the level of credibility from each of the organizations B and C to the organization A. Accordingly, the concealment process is performed based on the determined details of concealment.

The example of the credibility table 184, which is depicted in FIG. 8, and the example of the concealment definition table 185, which is depicted in FIG. 9, are now used to describe the concealment process performed when the organization B has provided the analysis information in response to an analysis request made to the analysis device 104 by the organization A. In this instance, the threshold for shared analysis information that is defined in the concealment policy 132 transmitted from the organization A is assumed to be 0.4 in the case of the medium credibility threshold 403 and 0.65 in the case of the high credibility threshold 404. In this situation, when the organization B, which has provided the analysis information, is regarded as the evaluation source organization, and the organization A, which has made an analysis request, is regarded as the evaluation destination organization, the credibility is determined to be 0.6 from the credibility table 184 depicted in FIG. 8. When the credibility value of 0.6 is compared with the aforementioned threshold indicated in the concealment policy 132, $0.4<0.6<0.65$. Therefore, the level of credibility from the organization B to the organization A is determined to be equivalent to the "medium credibility." Consequently, in a case, for example, where the shared analysis information is incident handling information, the concealment process is performed to conceal tool information and the like in accordance with the concealment definition table 185 depicted in FIG. 9.

A credibility information update process of updating the information indicating the level of credibility from an organization that has requested the analysis device 104 to make an analysis to an organization that has shared the analysis information will now be described with reference to FIG. 11. FIG. 11 is a flowchart illustrating the credibility information update process that is performed to update the information indicating the level of credibility from an analysis requesting organization to an information sharing organization. This process corresponds to step S1010 of FIG. 10, and is performed by the credibility update section 175 loaded into the main memory 163 of the analysis device 104.

The credibility update section 175 performs steps S1102 to S1107 below on each organization listed in the organization information table 182 (step S1101).

First, the credibility update section 175 determines whether an organization targeted for processing has provided the analysis logic 131 to the analysis device 104 in step S1005 of FIG. 10 (step S1102).

If it is determined in step S1102 that the relevant organization has provided the analysis logic 131 ("YES" at step S1102), the credibility update section 175 references the credit score table 183, regards an organization that has requested the analysis device 104 to make an analysis, as the evaluation source organization, regards the relevant organization as the evaluation destination organization, and adds the value 1 to the credit score for the combination of these organizations (step S1103). In this instance, the value to be added to the credit score is not limited to 1, but may be more or less than 1. In contrast, if it is determined in step S1102 that the relevant organization has not provided the analysis logic 131 ("NO" at step S1102), the credibility update section 175 does not perform the process of step S1103.

Next, the credibility update section 175 determines whether the analysis information collected from the organization targeted for processing has been used for the analysis performed in step S1009 of FIG. 10 by the analysis section 174 (step S1104). The query in step S1104 is answered "NO" if, for example, it is determined at the time of concealment processing in step S1008 of FIG. 10 that the organization has low credibility and is not allowed to share the analysis information or does not own necessary analysis information and does not share the analysis information. The reason is that the analysis information collected from such an organization is not used for analysis.

If it is determined in step S1104 that the analysis information collected from the relevant organization has been used for the analysis by the analysis section 174 ("YES" at step S1104), the credibility update section 175 references the credit score table 183, regards an organization that has requested the analysis device 104 to make an analysis, as the evaluation source organization, regards the relevant organization as the evaluation destination organization, and adds the value 1 to the credit score for the combination of these organizations (step S1105). In this instance, the value to be added to the credit score is not limited to 1, but may be more or less than 1.

Next, the credibility update section 175 evaluates how much the analysis information collected from the relevant organization and shared is involved in the analysis (step S1106). For instance, in a case where an analysis is made to find suspicious connection destination IP addresses by using forward proxy access logs, for example, the number of access logs related to the analysis information shared from the relevant organization and the number of suspicious IP addresses contained in the access logs can be used to evaluate the degree of involvement of the analysis information in the analysis. The method of evaluation used in such a case may or may not depend on the analysis logic 131.

Subsequently, based on the result of evaluation in step S1106, the credibility update section 175 determines the value to be added to the credit score indicating the level of credibility from the analysis requesting organization, which has requested the analysis device 104 to make an analysis, to the relevant organization, and updates the credit score table 183 by using the determined value to be added (step S1107). In this instance, if the value indicating the result of evaluation in step S1106 is low, the value to be added to the credit score may be 0, or may be set as a negative value to subtract from the credit score.

In contrast, if it is determined in step S1104 that the analysis information has not been used for the analysis by the analysis section 174 ("NO" at step S1104), the credibility update section 175 does not perform the process of steps S1105 to S1107.

After exiting the loop in step S1101, the credibility update section 175 normalizes the credit score determined between the organizations to calculate the level of credibility (step S1108). In this instance, the credit score between the organizations is multiplied by a predetermined coefficient to achieve normalization and calculate the credibility so that the levels of credibility between all the organizations are in the range of 0 to 1. When the values of credibility calculated here are recorded in the credibility table 184, the latest reliability scores recorded in the credit score table 183 is reflected to update the credibility table 184.

In the analysis device 104, the credibility update section 175 performs the above-described process of updating the credibility information indicating the level of credibility from an analysis requesting organization to an information sharing organization. As a result, the credibility recorded in the credibility table 184 can be updated for each organization in accordance with the history of provision of the analysis logic 131 from each organization and the degree of contribution of analysis information from each organization to the analysis performed by the analysis section 174. It should be noted that the flowchart of FIG. 11, which is referenced to describe the present embodiment, is merely an example of a processing procedure for performing process of updating the credibility information indicating the level of credibility from an analysis requesting organization to an information sharing organization. Therefore, the credibility table 184 may alternatively be updated by raising or lowering the credit score based on other points of evaluation.

The credit score calculation process will now be described in detail with reference to FIG. 12. FIG. 12 is a flowchart illustrating the credit score calculation process that is performed to calculate the level of credibility from an information sharing organization to an analysis requesting organization. This process corresponds to step S1013 of FIG. 10, and is performed by the analysis result evaluation section 152 loaded into the main memory 143 of the reception device 102.

Figure 12:
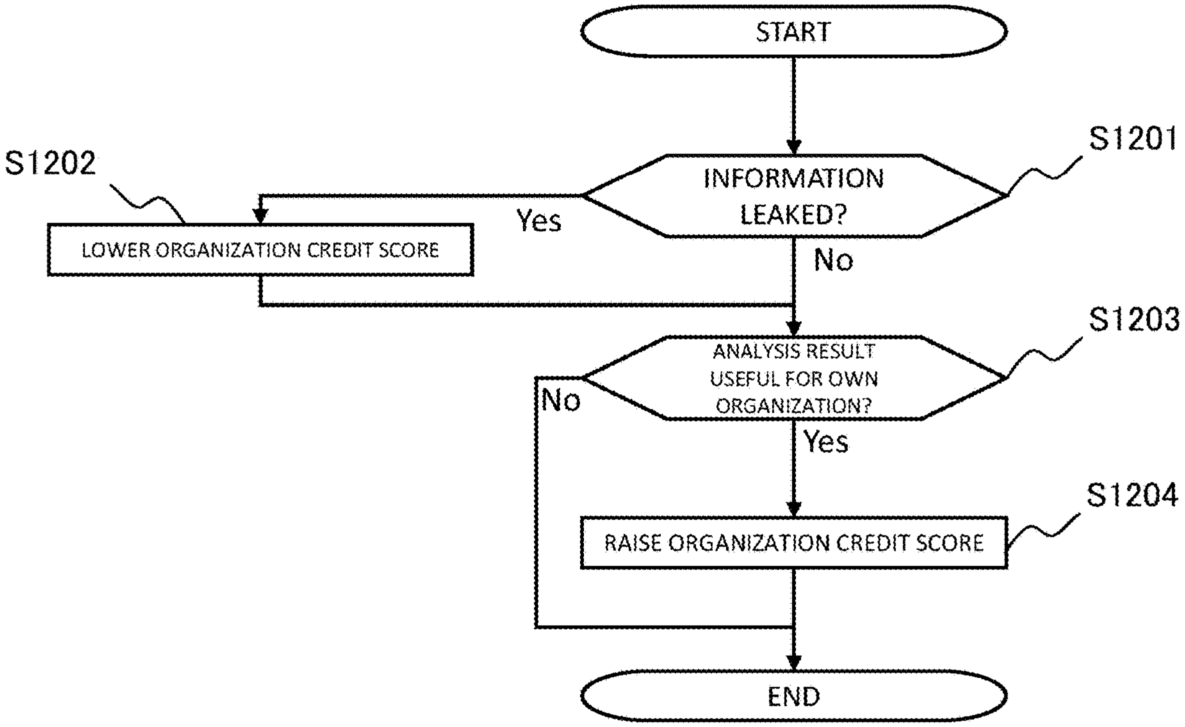
FIG. 12 is a flowchart illustrating an example of a credit score calculation process that is performed to calculate the level of credibility from an information sharing organization to an analysis requesting organization.

It should be noted that the credit score calculation process depicted in FIG. 12 is performed when the reception device 102 of each organization receives the analysis result from the analysis device 104 or when a predetermined time has elapsed since the analysis information is shared by the relevant organization. The time interval between the instant at which the analysis information is shared and the instant at which the process is performed may be set by the administrator for each organization.

First, the analysis result evaluation section 152 determines whether the analysis information transmitted from the relevant organization to the analysis device 104 for sharing purposes leaked (step S1201). This determination is made by using, for example, a declaration from an organization that has provided the analysis logic 131 to the analysis device 104, a declaration from an organization that has requested the analysis device 104 to make an analysis, or reports from the other organizations.

If it is determined in step S1201 that the shared analysis information is leaked ("YES" at step S1201), the analysis result evaluation section 152 subtracts the value 1 from the credit score indicating the level of credibility from the relevant organization to an organization that has requested the analysis device 104 to make an analysis (step S1202). The value to be subtracted from the credit score is not limited to 1, but may be more or less than 1. The initial value of the credit score is, for example, 0. The credit score may be negative when a certain value is subtracted from the initial value. In contrast, if it is determined in step S1201 that the shared analysis information is not leaked ("NO" at step S1201), the analysis result evaluation section 152 does not perform the process of step S1202.

Next, the analysis result evaluation section 152 determines whether the result of analysis by the analysis device 104 is useful for the own organization (step S1203).

If it is determined in step S1203 that the result of analysis is useful for the own organization ("YES" at step S1203), the analysis result evaluation section 152 adds a predetermined value to the credit score indicating the level of credibility from the relevant organization to an organization that has requested the analysis device 104 to make an analysis (step S1204). The value to be added in this instance may be a preset value, or may be determined based on the level of usefulness of the result of analysis in the own organization.

It should be noted that the flowchart of FIG. 12, which is referenced to describe the present embodiment, is merely an example of a processing procedure for calculating the credit score. Therefore, the credit score may alternatively be raised or lowered based on other points of evaluation.

The following describes a process of updating the credibility information indicating the level of credibility from an information sharing organization to an organization that has requested the analysis device 104 to make an analysis. This process corresponds to step S1015 of FIG. 10, and is performed when the calculated credit score transmitted from the transmission device 101 of each organization in step S1014 of FIG. 10 is received by the credibility update section 175 loaded into the main memory 163 of the analysis device 104.

Upon receiving the credit score from the transmission device 101 of each organization that has shared the analysis information, the credibility update section 175 updates the credit score table 183 by using the received credit score. In this instance, the credibility update section 175 regards an organization that has transmitted the credit score, as the evaluation source organization, regards an organization that has requested the analysis device 104 to make an analysis, as the evaluation destination organization, and adds the received credit score to the credit score in a field corresponding to the combination of these organizations.

Next, the credibility update section 175 normalizes the credit score by using the updated credit score table 183, and stores the result of normalization in the credibility table 184. In this instance, the credit score is normalized to calculate the level of credibility in the same manner as in step S1108 of FIG. 11, and the result of calculation is reflected to update the credibility table 184.

In the analysis device 104, the credibility update section 175 performs the above-described process of updating the credibility information indicating the level of credibility from an information sharing organization to an analysis requesting organization in accordance with the credit score that is calculated by each organization in the credit score calculation process depicted in FIG. 12 and transmitted to the analysis device 104. As a result, the credibility recorded in the credibility table 184 can be updated for each organization in accordance with the usefulness of the analysis result obtained in each organization.

The following describes an example of the method for determining the level of credibility when a new organization enters the information sharing system 1 according to the present embodiment.

Here, it is assumed that an organization N newly joins the information sharing system 1 with an introduction from the organization A, which is already a member of the information sharing system 1. In this case, it is conceivable that there is already a certain level of credibility between the organizations A and N. Therefore, the level of credibility between the organization A and the newly joining organization N can be set on the assumption that the administrator of the organization A decides the level of credibility from the organization A to the organization N, and that the administrator of the organization N decides the level of credibility from the organization N to the organization A.

However, the above-described credibility determination method cannot be used between the newly joining organization N and an organization other than the organization A. Therefore, the following describes a method that uses the credibility set between the organizations A and N in order to determine the level of credibility between the organization N and an organization other than the organization A, which is already a member of the information sharing system 1.

When a target organization for which the level of credibility from the organization N is to be determined is an organization X, the level of credibility from the organization X to the organization A is $T_{X\ to\ A}$, and the level of credibility from the organization A to the organization N is $T_{A\ to\ N}$, the level of credibility $T_{X\ to\ N}$ from the organization X to the organization Nis calculated, for example, by Equation (1) below.

$$T_{X\ to\ N} = T_{X\ to\ A} \times T_{A\ to\ N} \tag{1}$$

Further, when the level of credibility from the organization A to the organization X is $T_{A\ to\ X}$, and the level of credibility from the organization N to the organization A is $T_{N\ to\ A}$, the level of credibility $T_{N\ to\ X}$ from the organization N to the organization X is calculated, for example, by Equation (2) below.

$$T_{N\ to\ X} = T_{N\ to\ A} \times T_{A\ to\ X} \tag{2}$$

It should be noted that the level of credibility $T_{X\ to\ N}$ from the organization X to the organization N, which is calculated by Equation (1), and the level of credibility $T_{N\ to\ X}$ from the organization N to the organization X, which is calculated by Equation (2), may be adjusted as needed by multiplying the right sides of Equations (1) and (2) above by a predetermined coefficient.

Figure 13:
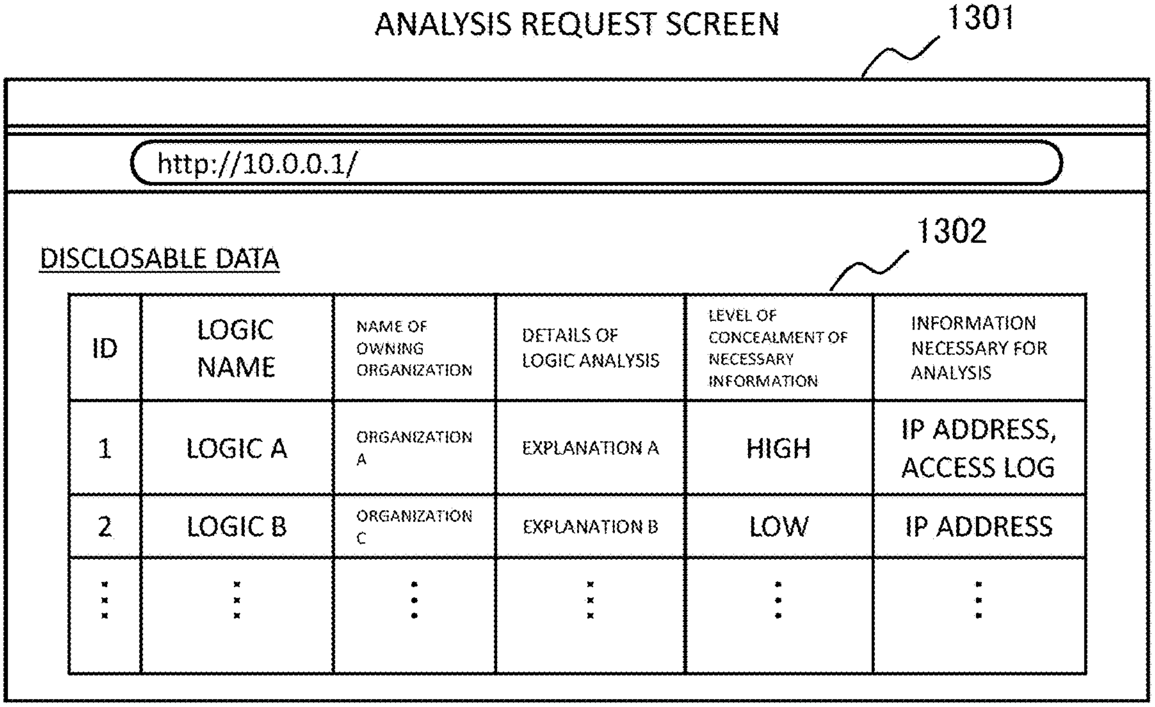
FIG. 13 is a diagram illustrating an example of an analysis request screen.

An analysis request screen will now be described with reference to FIG. 13. The analysis request screen appears on the display of the input/output device 117 of an organization that makes an analysis request to the analysis device 104. FIG. 13 is a diagram illustrating an example of the analysis request screen. The analysis request screen 1301 depicted in FIG. 13 has disclosable data 1302.

The disclosable data 1302 is displayed in an area that displays the contents of the logic information table 181. When making an analysis request to the analysis device 104, the administrator of each organization can determine the details of analysis by selecting an appropriate analysis logic 131 in accordance with the information displayed as the disclosable data 1302.

Figure 14:
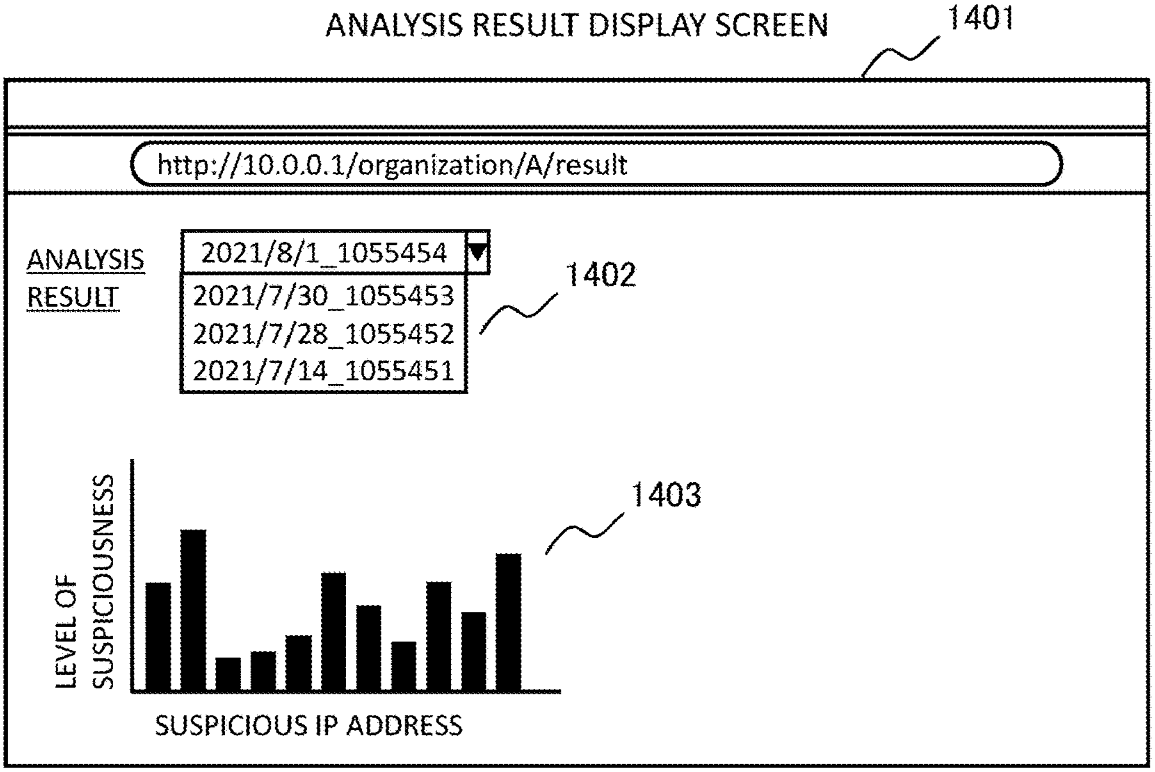
FIG. 14 is a diagram illustrating an example of an analysis result display screen.

An analysis result display screen will now be described with reference to FIG. 14. The analysis result display screen appears on the display of the input/output device 117 of an organization to which the analysis result is transmitted from the analysis device 104. FIG. 14 is a diagram illustrating an example of the analysis result display screen. The analysis result display screen 1401 depicted in FIG. 14 is a screen that displays the result of a previous analysis made by the analysis device 104, and includes an analysis result selection section 1402 and an analysis result display area 1403.

The analysis result selection section 1402 allows the administrator of each organization to select the analysis result to be displayed. For example, the storage device 114 included in the transmission device 101 of each organization stores previous analysis results under a name that is formed by a set of numerals joined by an underscore to uniquely identify the date of analysis execution and the result of analysis. By selecting an appropriate name, the administrator can display a desired analysis result on the analysis result display screen 1401.

The analysis result display area 1403 displays the details of an analysis result. For example, the result of analysis of suspicious IP addresses is presented by a graph that indicates the level of suspiciousness of each suspicious IP address as depicted in FIG. 14. It should be noted that the analysis results displayed in the analysis result display area 1403 need not necessarily be presented by a graph as depicted in FIG. 14, but may be presented in a tabular form or in some other form. Further, text describing the details of the analysis results may be additionally displayed.

An organization information edit screen will now be described with reference to FIG. 15. The organization information edit screen appears on the display of the input/output device 117 of each organization. FIG. 15 is a diagram illustrating an example of the organization information edit screen. The organization information edit screen 1501 depicted in FIG. 15 is used to make a request for changing the contents of the logic information table 181 and organization information table 182, which are stored in the storage device 164 in the analysis device 104 in accordance with the results obtained when the information of the own organization is edited by the administrator of each organization, and the concealment policy 132 stored in the storage device 114 in the reception device 102. The organization information edit screen 1501 includes a logic information edit section 1502, a concealment policy edit section 1503, and an organization information edit section 1504.

The logic information edit section 1502 is displayed in an area that is used by the administrator to edit the logic information table 181, which stores the information regarding the analysis logic 131, in accordance with the contents of changes made when the analysis logic 131 is newly developed by the own organization or the existing analysis logic 131 is changed by the own organization. The analysis logic 131 displayed in this area concerns only the contents that are described in the logic information table 181 stored in the storage device 164 included in the analysis device 104 and are related to the analysis logic 131 owned by the relevant organization. This area does not display the analysis logic 131 of the other organizations.

The concealment policy edit section 1503 is displayed in an area that is used by the administrator to edit the concealment policy 132 of the own organization. This area displays the contents of the concealment policy 132 owned by the relevant organization.

The organization information edit section 1504 is displayed in an area that is used by the administrator to edit the organization information table 182 of the own organization. The organization information displayed in this area concerns only the contents that are described in the organization information table 182 stored in the storage device 164 included in the analysis device 104 and are related to the relevant organization. This area does not display the information of the other organizations.

The first embodiment of the present invention, which has been described above, provides the following operational advantages.

(1) In the information sharing system 1, the analysis device 104 includes the concealment processing section 173, the analysis section 174, and the information transmission section 172. The concealment processing section 173 conceals the analysis information collected from any one or more of multiple organizations forming the information sharing system 1 in accordance with the level of credibility between the organizations. The analysis section 174 makes an analysis by using the analysis information concealed by the concealment processing section 173 and the analysis logic 131 collected from any one or more of the multiple organizations. The information transmission section 172 transmits the result of analysis by the analysis section 174 to any one or more of the multiple organizations, and allows each organization to share the result of analysis. Accordingly, it is possible to achieve secure information sharing between the multiple organizations.

(2) The analysis device 104 includes the credibility update section 175 that updates the level of credibility. Accordingly, it is possible to maintain the latest level of credibility between the organizations in accordance with the operational status of the information sharing system 1.

(3) The credibility update section 175 updates the level of credibility of each organization in accordance with the history of analysis logic provision from each organization, the degree of contribution of the analysis information to analysis, and the usefulness of the analysis result (steps S1010 and S1015). Accordingly, it is possible to appropriately determine the level of credibility between the organizations in accordance with the degree of involvement of each organization in analysis in the information sharing system 1.

(4) The information transmission section 172 determines, based on the level of credibility, whether or not to share the analysis result, and transmits the analysis result to organizations other than those that are determined not to share the analysis result with (step S1011). Accordingly, it is possible to prevent information leakage by not sharing the analysis result with organizations whose credibility is low.

(5) The concealment processing section 173 determines, based on the level of credibility, whether or not each organization is to use the analysis information in analysis, and conceals the analysis information other than analysis information that is determined not to be used in analysis (step S1008). In step S1011, the information transmission section 172 determines that the analysis result is not to be shared by organizations that have provided the analysis information that is determined, by the concealment processing section 173, not to be used in analysis. Accordingly, it is possible to prevent an improper analysis result from being obtained through the use of the analysis information provided from organizations whose credibility is low. Additionally, such organizations can be prevented from sharing the analysis result.

(6) The multiple organizations forming the information sharing system 1 each include the transmission device 101 and the reception device 102. The transmission device 101 of each organization transmits the analysis information to the analysis device 104 that is connected through the networks 103 and 105 and the Internet 106, which act as communication lines (steps S1003 and S1007). The analysis device 104, which includes the concealment processing section 173, the analysis section 174, and the information transmission section 172, collects the analysis information by receiving the analysis information transmitted from the transmission device 101 of the multiple organizations (steps S1004 and S1006), and conceals the collected analysis information (step S1008). The reception device 102 of each organization receives the analysis result transmitted from the analysis device 104 (step S1012). Accordingly, it is possible to implement the information sharing system 1 that collects the analysis information from any one or more of the multiple organizations, makes an analysis with the collected analysis information concealed, and allows each organization to share the obtained analysis result.

Second Embodiment

Figure 16:
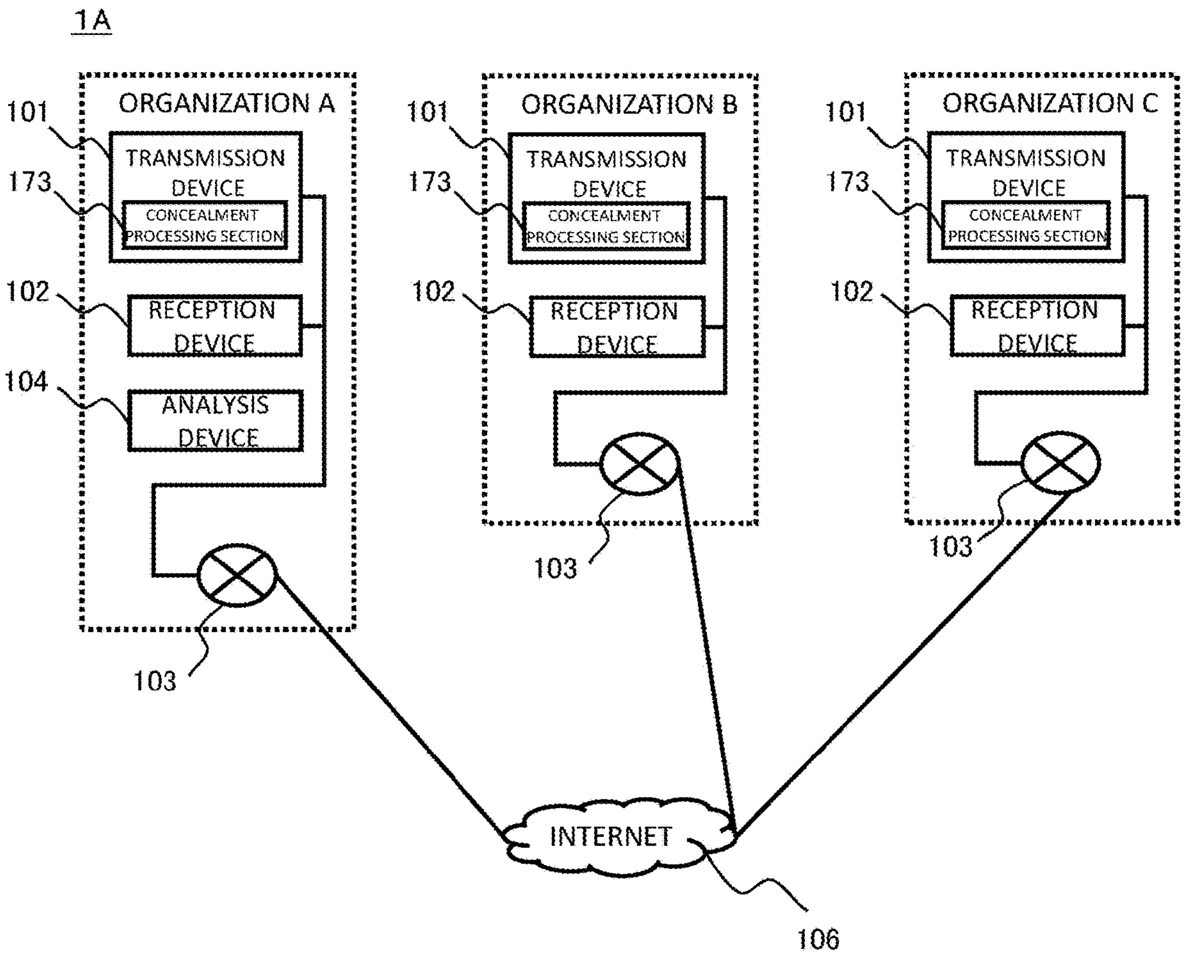
FIG. 16 is a diagram illustrating an example of the overall configuration of the information sharing system according to a second embodiment of the present invention.

The information sharing system according to a second embodiment of the present invention will now be described with reference to FIG. 16. FIG. 16 is a diagram illustrating an overall configuration of the information sharing system 1A according to the second embodiment of the present invention. The configuration of the information sharing system 1A according to the present embodiment is partially different from the configuration of the information sharing system 1 according to the first embodiment, which has been described above.

As depicted in FIG. 16, in the information sharing system 1A, the organization A owns the analysis device 104 in addition to the transmission device 101 and the reception device 102. Further, the transmission device 101 owned by each organization includes the concealment processing section 173, which is included in the analysis device 104 included in the information sharing system 1. Therefore, the shared analysis information is concealed by the transmission device 101 of each organization before being transmitted to the analysis device 104. Accordingly, even if the shared analysis information includes sensitive information, the organization B and the organization C can prevent the sensitive information from being known to organization A, which owns the analysis device 104. However, as described in conjunction with the first embodiment, the credibility table 184 indicating the level of credibility between the organizations is stored in the analysis device 104 and centrally managed. Consequently, in the information sharing system 1A according to the second embodiment, the transmission device 101 of each organization needs to communicate with the analysis device 104 and acquires the credibility information regarding each of the other organizations before performing the concealment process on the analysis information.

Except those as described above, the configurations and functions of the transmission device 101 and reception device 102 owned by each organization forming the information sharing system 1A and the configuration and functions of the analysis device 104 are similar to those in the information sharing system 1 according to the first embodiment.

According to the second embodiment of the present invention, which has been described above, the multiple organizations forming the information sharing system 1A each own the concealment processing section 173, the transmission device 101, and the reception device 102. The concealment processing section 173 of each organization collects and conceals the analysis information of the relevant organization. The transmission device 101 of each organization transmits the concealed analysis information to the analysis device 104, which is connected through the network 103 and the Internet 106, which act as communication lines. The analysis device 104 includes the analysis section 174 and the information transmission section 172, and collects the concealed analysis information by receiving the analysis information transmitted from the transmission device 101 of each of the multiple organizations. The reception device 102 of each organization receives the analysis result transmitted from the analysis device 104. Accordingly, it is possible to implement the information sharing system 1A that conceals the analysis information before being shared by each organization and allows each organization to share the analysis result.

Third Embodiment

Figure 17:
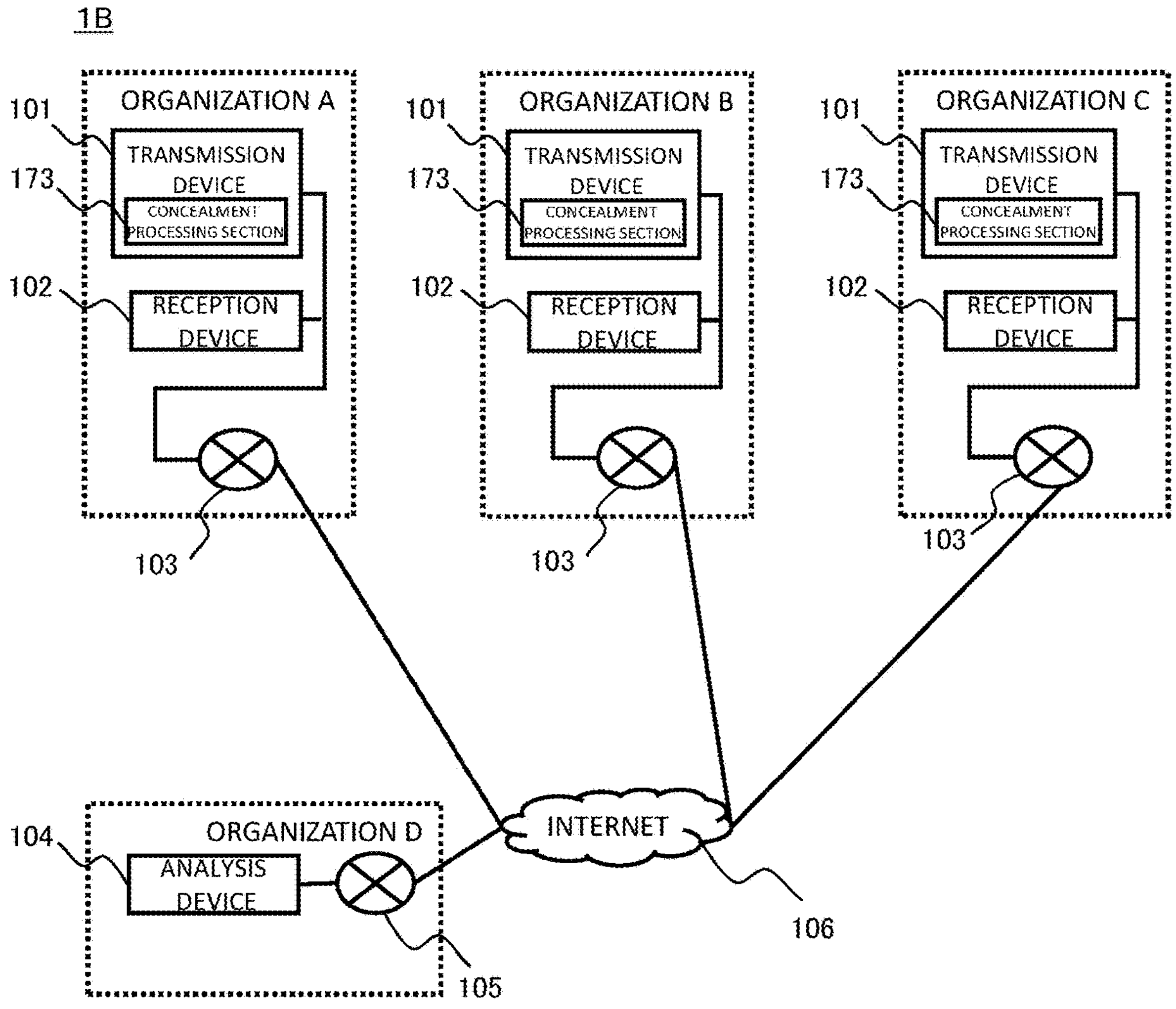
FIG. 17 is a diagram illustrating an example of the overall configuration of the information sharing system according to a third embodiment of the present invention.

The information sharing system according to a third embodiment of the present invention will now be described with reference to FIGS. 17, 18, and 19. FIG. 17 is a diagram illustrating an overall configuration of the information sharing system 1B according to the third embodiment of the present invention. As is the case with the information sharing system 1 according to the first embodiment, the information sharing system according to the third embodiment is configured such that the organizations A, B, and C, each of which has the transmission device 101 and the reception device 102, and the organization D, which owns the analysis device 104, are connected to the Internet 106 through the networks 103 and 105.

The transmission device 101 owned by each of the organizations A to C includes the concealment processing section 173, as is the case with the transmission device 101 of the information sharing system 1A according to the second embodiment. In other respects, the configurations and functions of the transmission device 101 and reception device 102 of each of the organizations A to C and the configuration and functions of the analysis device 104 of the organization D are similar to those in the information sharing system 1 according to the first embodiment. It should be noted that the analysis device 104 may be owned by any one of the organizations A to C.

The difference between the information sharing system 1B according to the third embodiment and the information sharing systems 1 and 1A described in conjunction with the first and second embodiments, respectively, is the starting point at which the analysis device 104 begins to perform the analysis process. Specifically, the first and second embodiments perform the analysis process when a certain organization requests the analysis device 104 to make an analysis. However, the third embodiment performs the analysis process when a certain organization determines that a detailed analysis needs to be made based on the shared analysis information. More specifically, firstly, each time the analysis information owned by an organization is updated, the organization provides the updated analysis information to the other organizations for sharing purposes. The analysis information shared between the multiple organizations in this manner is hereafter referred to the "shared analysis information." Next, when an organization views the shared analysis information provided from another organization and determines that an analysis needs to be made, the organization requests the analysis device 104 to make an analysis. Subsequently, the third embodiment starts to perform the processing as depicted in the flowchart of FIG. 10, which has been described in conjunction with the first embodiment.

In contrast, when an organization views the shared analysis information provided from another organization and determines that no analysis is required, the organization may extract the internally owned analysis information that is associated with the shared analysis information (hereinafter referred to as the "associated analysis information") and return the extracted associated analysis information to an organization that has provided the shared analysis information. In this case, by using the associated analysis information returned from the organization that has determined that no analysis is required, the organization that has provided the shared analysis information may perform the credibility update process on the relevant organization. In a situation where the credibility update process is performed in the above manner, even if another organization has determined that no analysis is required, the organization that has initially provided the shared analysis information is able to obtain a benefit by acquiring, as the associated analysis information, the analysis information highly associated with the shared analysis information owned by the relevant organization. Further, the organization that has returned the associated analysis information can expect an improvement in the credibility to the own organization, and is thus able to conduct advantageous information transactions from next time on. As a result, it is expected that information sharing between the multiple organizations will be further promoted.

Figure 18:
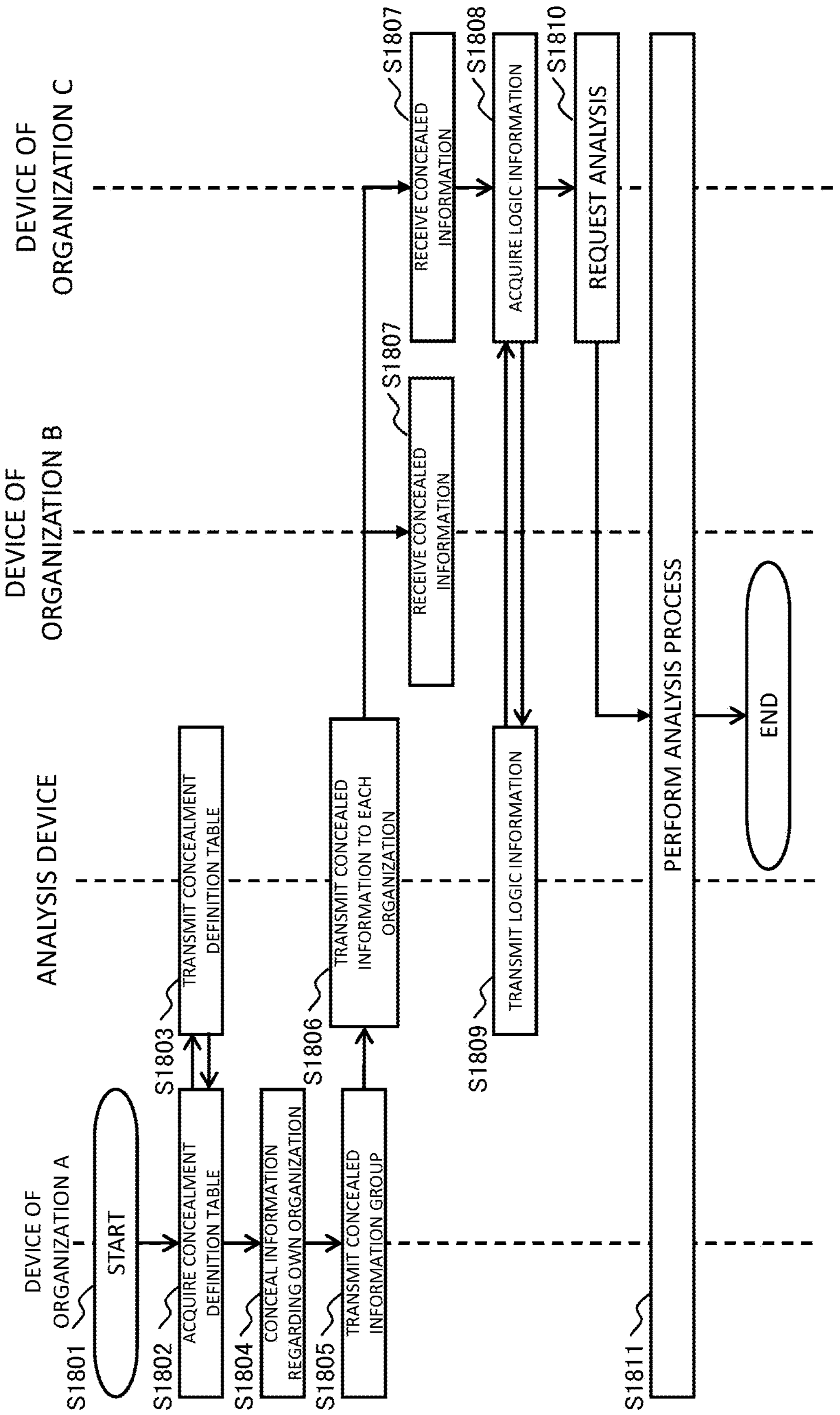
FIG. 18 is an example of a flowchart illustrating a case where it is determined that an analysis needs to be made in the overall process of the information sharing system according to the third embodiment of the present invention.
Figure 19:
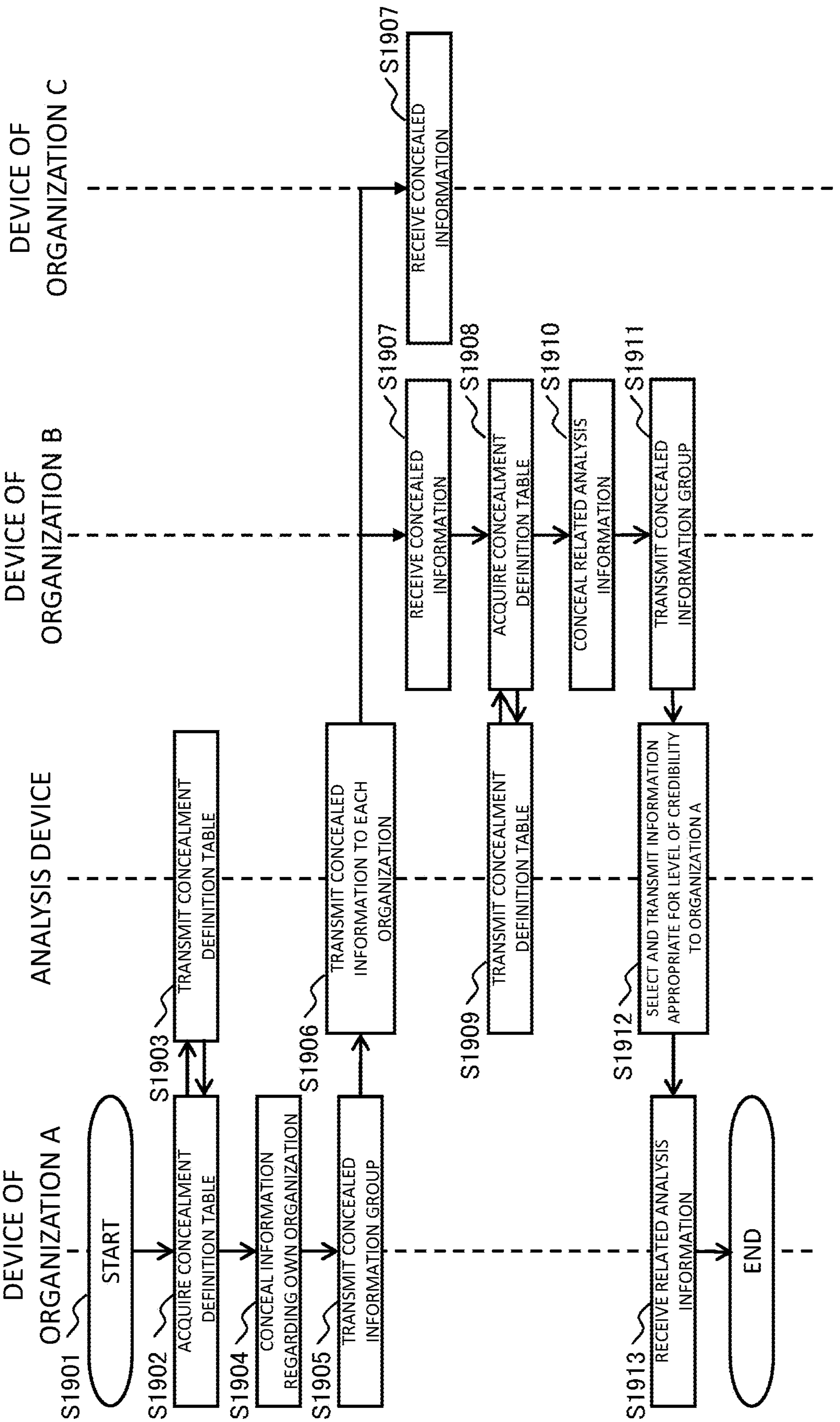
FIG. 19 is an example of a flowchart illustrating a case where it is determined that no analysis needs to be made in the overall process of the information sharing system according to the third embodiment of the present invention, and information related to shared information owned by an own organization is returned to an information providing organization.

The processing performed by the information sharing system 1B according to the third embodiment will now be outlined with reference to FIGS. 18 and 19. FIGS. 18 and 19 are flowcharts illustrating the overall process of the information sharing system 1B according to the third embodiment of the present invention. FIG. 18 is a flowchart illustrating a case where it is determined that an analysis needs to be made by an organization that has viewed the shared analysis information.

Upon detecting that the analysis information to be shared with the other organizations is added or updated, the transmission device 101 of the organization A starts to perform the processing depicted in the flowchart of FIG. 18 (step S1801). Alternatively, the processing depicted in the flowchart of FIG. 18 may be started at a different time point. For example, the processing may be started upon detection of a situation where the analysis information is added or updated multiple times or started manually by the administrator of the organization A. Although FIG. 1018 depicts an example in which the transmission device 101 of the organization A starts the processing, the same applies to a case where the transmission device 101 of the organization B or C starts the processing.

When the processing starts in step S1801, the transmission device 101 of the organization A requests the concealment definition table 185 from the analysis device 104 (step S1802).

Upon receiving a request for the concealment definition table 185 from the transmission device 101 of the organization A, the analysis device 104 transmits the concealment definition table 185 to the organization A (step S1803).

When the concealment definition table 185 is transmitted from the analysis device 104, the organization A causes the reception device 102 to receive the concealment definition table 185, and outputs the concealment definition table 185 to the transmission device 101. The transmission device 101 conceals the analysis information possessed by the own organization, by using the received concealment definition table 185, and creates a group of concealed analysis information (concealed information group), which is concealed at a concealment level that varies from one organization to another (step S1804).

Next, the transmission device 101 of the organization A transmits, to the analysis device 104, the concealed information group, which has been created in step S1804, and credibility threshold information regarding the level of credibility to the analysis information, which is determined by referencing the concealment policy 132 (step S1805).

Upon receiving the above-mentioned items of information from the transmission device 101 of the organization A, the analysis device 104 uses the credibility table 184, the organization information table 182, and the received credibility threshold information to divide the concealed information group, which is provided from the organization A, into analysis information (concealed information) concealed at a concealment level appropriate for the level of credibility from the organization A to each of the other organizations, and transmits the resulting analysis information to each organization other than the organization A as the shared analysis information provided by the organization A (step S1806). For example, for the organization B, the level of credibility from the organization A to the organization B is determined from the credibility table 184, and the level of concealment from the organization A to the organization B is determined in accordance with the above-mentioned level of credibility and with the credibility threshold information received from the organization A. Then, the concealed information concealed at the determined level of concealment is extracted from the concealed information group and transmitted to the reception device 102 of the organization B as the shared analysis information. In this instance, the information at the transmission destination is identified by acquiring the connection destination IP address of the organization B from the organization information table 182. For the organization C, too, the concealed information serving as the shared analysis information is transmitted from the analysis device 104 to the reception device 102 by following the same procedure as described above. That is to say, in the analysis device 104, the information transmission section 172 transmits, to the organizations B and C, information that is concealed by the concealment processing section 173 of the organization A at a concealment level that varies from one organization to another based on the level of credibility, and allows each organization to share the concealed information. As a result, the analysis information concealed at a concealment level that varies from one organization to another based on the level of credibility between the organizations can be transmitted from the analysis device 104 to each organization and shared between the organizations. In this instance, as is the case with step S1011 of FIG. 10, which has been described in conjunction with the first embodiment, the analysis device 104 may transmit the concealed information in response to a request from the transmission device 101 owned by each organization instead of compulsorily transmitting the concealed information to each organization.

When the reception device 102 receives the concealed information (shared analysis information), which has been transmitted from the analysis device 104 (step S1807), the organizations B and C may view the received information and make an analysis at the discretion of each organization.

In the above instance, the organizations B and C may perform the process of evaluating the received concealed information (shared analysis information) and updating the credibility. In such a case, the organizations B and C determine whether the received shared analysis information is useful for the own organizations. If the result of such determination indicates that the shared analysis information is useful for the own organizations, a predetermined value is added to the credit score indicating the level of credibility from the organizations B and C to the organization A, which is a shared analysis information provider. The value to be added in this case may be a preset value, or may be determined based on the level of usefulness of the shared analysis information in the own organization. When the credit score determined in the above-described manner is transmitted from the organizations B and C to the analysis device 104, the analysis device 104 performs the credibility information update process.

Subsequently, the organizations B and C each determine whether the received concealed information (shared analysis information) needs to be analyzed in more detail. If the result of such determination indicates that, for example, the organization C needs to make a more detailed analysis in step S1807, the transmission device 101 of the organization C requests the logic information from the analysis device 104 (step S1808), as is the case with step S1001 of FIG. 10. Upon receiving such a request, the analysis device 104 transmits the logic information table 181 to the reception device 102 of the organization C (step S1809), as is the case with step S1002 of FIG. 10.

When the reception device 102 of the organization C receives the logic information table 181, the organization C references the logic information listed in the logic information table 181, and determines which executable analysis is to be made by the analysis device 104. After determination, the transmission device 101 of the organization C generates an analysis request, and transmits the generated analysis request to the analysis device 104 to request the analysis device 104 to make an analysis (step S1810).

Subsequently, the information sharing system 1B performs an analysis process (step S1811). In the analysis process, processing is performed in a manner similar to the processing in steps S1004 to S1015 of FIG. 10, so that the analysis device 104 makes an analysis by using the analysis information collected from the multiple organizations.

FIG. 19 is a flowchart illustrating a case where an organization determines, after viewing the shared analysis information, that no analysis is required, and then returns the related analysis information retained in the own organization to an organization that has provided the shared analysis information.

The processing in steps S1901 to S1907 is the same as the processing in steps S1801 to S1807 of FIG. 18. If it is determined in step S1907 that a more detailed analysis is not required, the relevant organization performs an internal search to determine whether there is the related analysis information corresponding to the received shared analysis information. Here, it is assumed in FIG. 19 that the organizations B and C have determined that no detailed analysis is required, and that the related analysis information is found in the organization B as a result of the internal search.

The transmission device 101 of the organization B requests the concealment definition table 185 from the analysis device 104 (step S1908).

Upon receiving the request for the concealment definition table 185 from the transmission device 101 of the organization B, the analysis device 104 transmits the concealment definition table 185 to the organization B (step S1909).

When the concealment definition table 185 is transmitted from the analysis device 104, the organization B receives the concealment definition table 185 by using the reception device 102, and outputs the concealment definition table 185 to the transmission device 101. The transmission device 101 causes the concealment processing section 173 to conceal the related analysis information retained by the own organization a number of times at different levels of concealment, through the use of the received concealment definition table 185, and creates a group of concealed related analysis information (concealed related analysis information group) (step S1910).

Next, the transmission device 101 of the organization B transmits, to the analysis device 104, the concealed related analysis information group, which has been created in step S1910, and the credibility threshold information, which has been obtained by referencing the concealment policy 132 (step S1911).

Upon receiving the above-mentioned items of information from the transmission device 101 of the organization B, the analysis device 104 selects, from the concealed related analysis information group provided from the organization B, the concealed related analysis information indicating a concealment level appropriate for the level of credibility from the organization B to the organization A by using the credibility table 184, the organization information table 182, and the received credibility threshold information, and then transmits the selected concealed related analysis information to the organization A (step S1912).

The concealed related analysis information transmitted from the analysis device 104 is received by the reception device 102 owned by the organization A (step S1913).

Having received the concealed related analysis information, the organization A may use the received concealed related analysis information to perform the process of updating the level of credibility from the organization A to the organization B. In this case, the credibility is updated by the processing similar to the processing in steps S1012 to S1015 of FIG. 10.

According to the third embodiment of the present invention, which has been described above, the multiple organizations forming the information sharing system 1B each own the concealment processing section 173, the transmission device 101, and the reception device 102. The concealment processing section 173 of each organization collects and conceals the analysis information of the relevant organization. The transmission device 101 of each organization transmits the concealed analysis information to the analysis device 104 that is connected through the networks 103 and 105 and the Internet 106, which act as communication lines. The analysis device 104 includes the analysis section 174 and the information transmission section 172, collects the concealed analysis information by receiving the analysis information transmitted from the transmission device 101 of each of the multiple organizations, and transmits the concealed analysis information, which is collected from each organization, to the other organizations. The reception device 102 of each organization receives the concealed analysis information and the analysis result, which are transmitted from the analysis device 104. Accordingly, it is possible to implement the information sharing system 1B that enables each organization to determine, based on the shared analysis information concealed by the other organizations, whether an analysis is required, make an analysis by using the analysis device 104 if it is determined that the analysis is required, and feed back the related information even if it is determined that no analysis is required.

Further, the transmission device 101 of each organization transmits, to the analysis device 104, the related analysis information that is included in the internally owned analysis information and related to concealed shared analysis information provided from the other organizations and transmitted by the analysis device 104. The information transmission section 172 transmits, to an organization that is among the multiple organizations and is the source of providing the concealed shared analysis information, the related analysis information transmitted from the transmission device 101 of each organization other than the relevant organization. In this instance, the information transmission section 172 transmits, at a concealment level appropriate for the level of credibility, the concealed related analysis information, which is transmitted from the transmission device 101 of each of the multiple organizations, to the organization acting as the source of providing the concealed shared analysis information. Accordingly, it is possible to implement the information sharing system 1B that is able to further promote information sharing between the multiple organizations.

Fourth Embodiment

Figure 20:
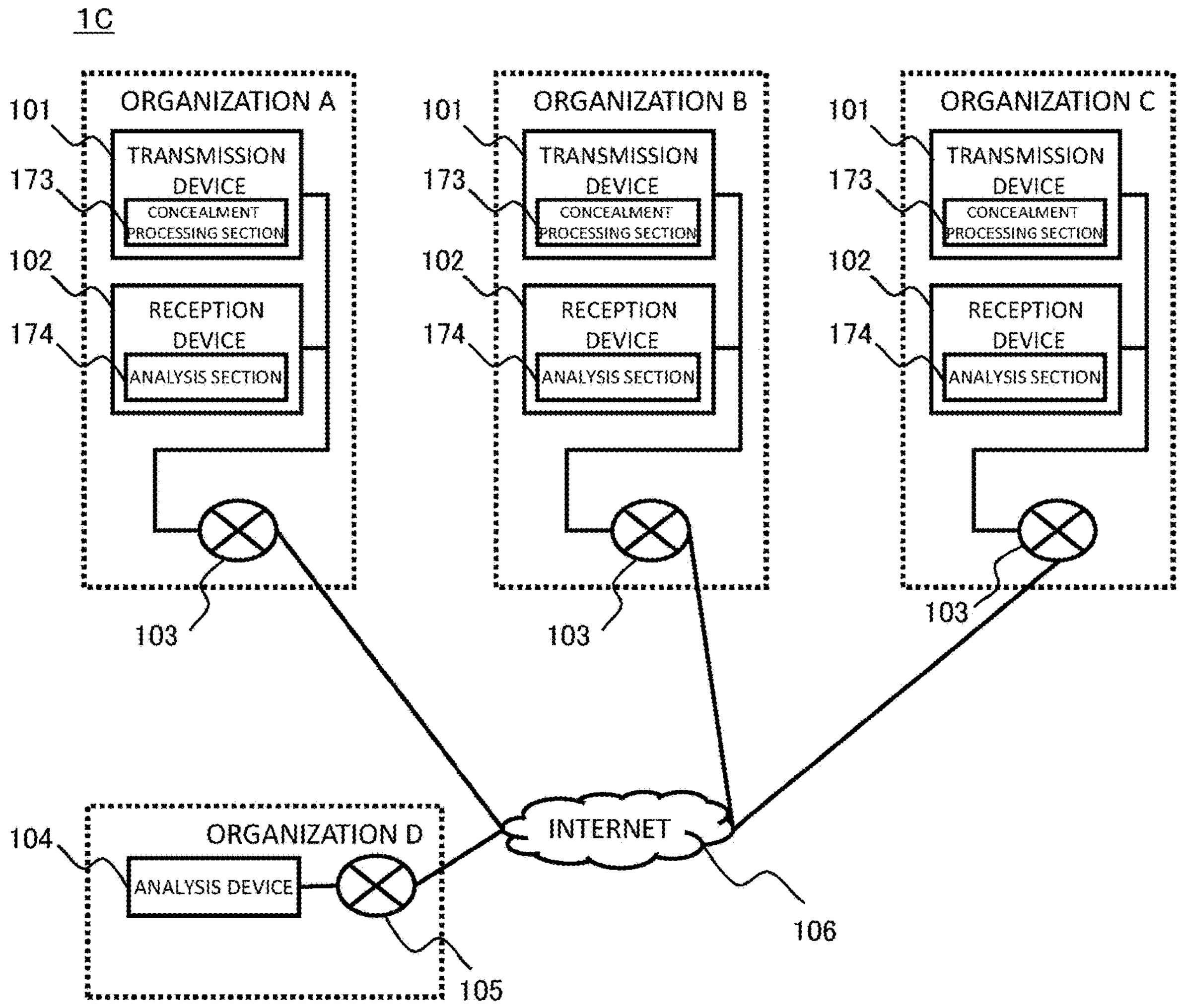
FIG. 20 is a diagram illustrating an example of the overall configuration of the information sharing system according to a fourth embodiment of the present invention.

The information sharing system according to a fourth embodiment of the present invention will now be described with reference to FIGS. 20 and 21. FIG. 20 is a diagram illustrating an overall configuration of the information sharing system 1C according to the fourth embodiment of the present invention. As is the case with the information sharing system 1 according to the first embodiment, the information sharing system according to the fourth embodiment is configured such that the organizations A, B, and C, which each own the transmission device 101 and the reception device 102, and the organization D, which owns the analysis device 104, are connected to the Internet 106 through the networks 103 and 105.

The transmission device 101 owned by each of the organizations A to C includes the concealment processing section 173, as is the case with the transmission device 101 of the information sharing systems 1A and 1B according to the second and third embodiments. Further, the reception device 102 owned by each of the organizations A to C includes the analysis section 174, which is included in the analysis device 104 in the foregoing embodiments. In other respects, the configurations and functions of the transmission device 101 and reception device 102 of the organizations A to C and the configuration and functions of the analysis device 104 of the organization D are similar to those in the information sharing system 1 according to the first embodiment. It should be noted that the analysis section 174 may alternatively be included in the transmission device 101 of the organizations A to C.

The difference between the information sharing system 1C according to the fourth embodiment and the information sharing systems 1, 1A, and 1B described in conjunction with the first to third embodiments, respectively, is that the analysis section 174 makes an analysis by using the analysis information retained by a single organization instead of the analysis information retained by the multiple organizations. Specifically, the fourth embodiment initially causes a single organization to make an analysis by using the analysis logic acquired from one or more organizations, conceals the result of the analysis, and allows the multiple organizations to share the concealed analysis result. Subsequently, the fourth embodiment evaluates the analysis result by using the method described in conjunction with the first embodiment, and performs the credibility update process.

Figure 21:
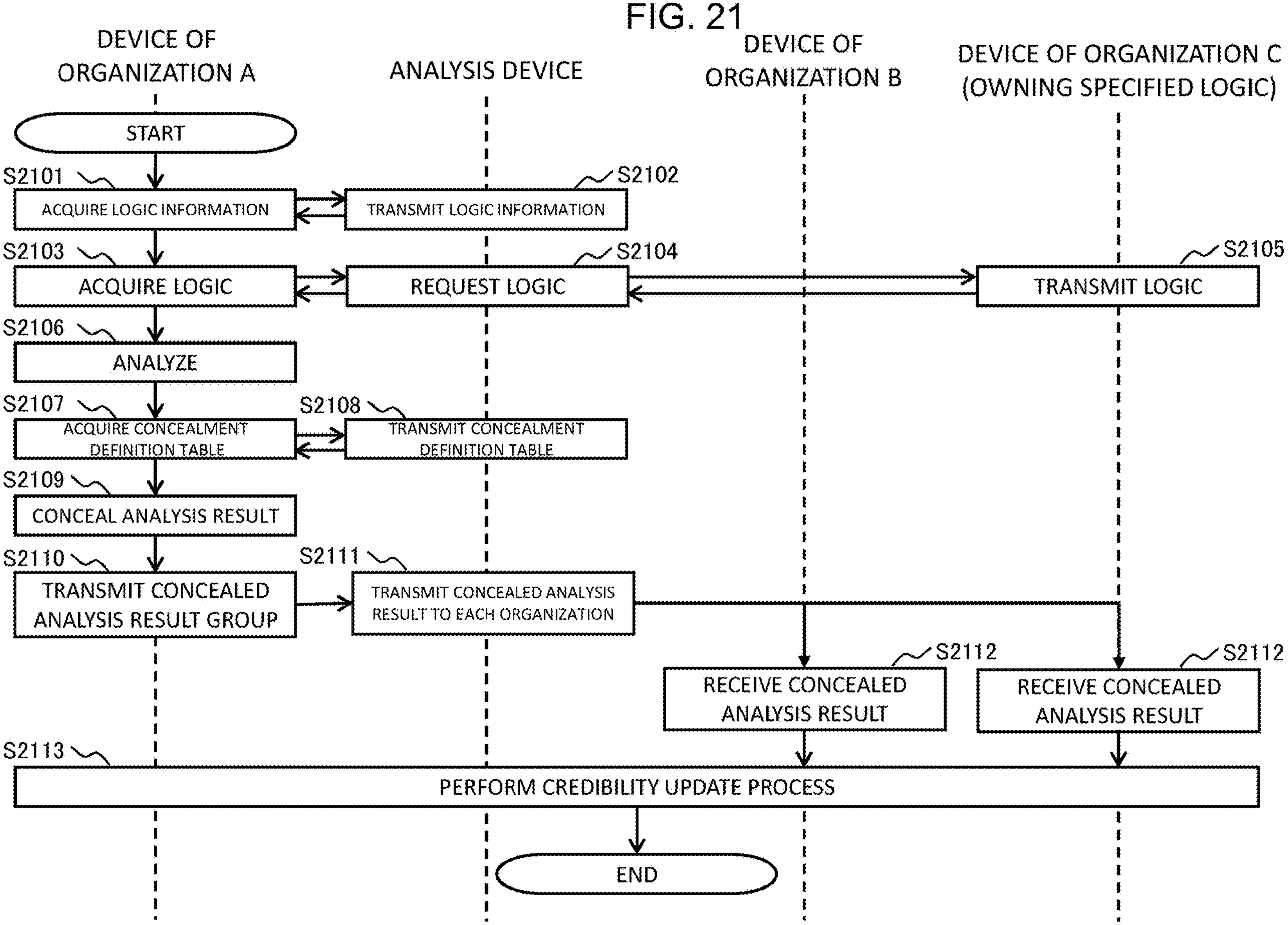
FIG. 21 is a flowchart illustrating an example of the overall process of the information sharing system according to the fourth embodiment of the present invention.

The processing performed by the information sharing system 1C according to the fourth embodiment will now be outlined with reference to FIG. 21. FIG. 21 is a flowchart illustrating an overall process of the information sharing system 1C according to the fourth embodiment of the present invention.

First, the transmission device 101 owned by the organization A requests the logic information from the analysis device 104 (step S2101).

Upon receiving the request for the logic information from the transmission device 101 of the organization A, the analysis device 104 causes the information transmission section 172 to transmit the logic information table 181 to the reception device 102 of the organization A (step S2102).

When the reception device 102 of the organization A receives the logic information table 181, the organization A references the logic information listed in the logic information table 181, and determines which analysis is to be made. After determination, the transmission device 101 of the organization A transmits information for identifying the analysis logic 131 for use in analysis to the analysis device 104, and attempts to acquire the analysis logic 131 (step S2103).

Upon receiving the analysis logic 131 transmitted from the transmission device 101 of the organization A, the analysis device 104 causes the request transmission section 171 to identify the analysis logic 131 for use in analysis and the organization retaining such analysis logic in accordance with the received information and the logic information table 181. Then, the analysis device 104 determines the connection destination of the identified organization by using the organization information table 182, and requests the determined connection destination to transmit the analysis logic 131 (step S2104). FIG. 21 depicts an example in which the organization C is requested to transmit the analysis logic 131, and the following description relates to this example. However, the same applies to a case where some other organization is requested to transmit the analysis logic 131.

Upon receiving the request for the transmission of the analysis logic 131 from the analysis device 104, the transmission device 101 of the organization C causes the analysis logic transmission section 123 to transmit the analysis logic 131 stored in the storage device 114 to the analysis device 104 (step S2105).

Upon receiving the analysis logic 131 transmitted from the transmission device 101 of the organization C, the analysis device 104 transmits the received analysis logic 131 to the organization A.

Upon receiving the analysis logic 131 transmitted from the analysis device 104, the reception device 102 of the organization A causes the analysis section 174 to make the analysis determined in step S2103 by using the received analysis logic 131 and the analysis information retained by the own organization (step S2106).

Next, the transmission device 101 of the organization A requests the concealment definition table 185 from the analysis device 104 (step S2107).

Upon receiving the request for the concealment definition table 185 from the transmission device 101 of the organization A, the analysis device 104 transmits the concealment definition table 185 to organization A (step S2108).

When the concealment definition table 185 is transmitted from the analysis device 104, the organization A causes the reception device 102 to receive the concealment definition table 185, and outputs the received concealment definition table 185 to the transmission device 101. The transmission device 101 causes the concealment processing section 173 to conceal the analysis result, which has been obtained in step S2106, by using the received concealment definition table 185 in accordance with the level of credibility between the organizations, and create a group of analysis results (concealed analysis result group), which is concealed at a concealment level that varies from one organization to another (step S2109).

Next, the transmission device 101 of the organization A transmits, to the analysis device 104, the concealed analysis result group, which has been created in step S2109, and the credibility threshold information, which has been obtained by referencing the concealment policy 132 and is related to the level of credibility to the analysis information used for analysis. (step S2110).

Upon receiving the above-mentioned items of information from the transmission device 101 of the organization A, the analysis device 104 uses the credibility table 184, the organization information table 182, and the received credibility threshold information to divide the concealed analysis result group, which is provided from the organization A, into analysis results (concealed analysis results) concealed at a concealment level appropriate for each organization, and transmits the concealed analysis results to each organization other than the organization A (step S2111). That is to say, the analysis device 104 causes the information transmission section 172 to transmit, to the organizations B and C, the analysis results, which are concealed, based on the level of credibility, by the concealment processing section 173 of the organization A at a concealment level that varies from one organization to another, and allows each organization to share the concealed analysis results. As a result, the concealed analysis results, which are concealed, based on the level of credibility between the organizations, at a concealment level that varies from one organization to another, can be transmitted from the analysis device 104 to each organization and shared between the organizations. In this instance, as is the case with step S1011 of FIG. 10, which has been described in conjunction with the first embodiment, the analysis device 104 may transmit the concealed analysis results in response to a request from the transmission device 101 owned by each organization instead of compulsorily transmitting the concealed analysis results to each organization.

The reception device 102 of each of the organizations B and C receives the concealed analysis results transmitted from the analysis device 104 (step S2112).

Subsequently, the information sharing system 1C performs the credibility update process (step S2113). In this credibility update process, the processing similar to the processing in steps S1013 to S1015 of FIG. 10 is performed to calculate the level of credibility to the organization A from each organization sharing the analysis results, and update the credibility.

According to the fourth embodiment of the present invention, which has been described above, the multiple organizations forming the information sharing system 1C each own the concealment processing section 173, the analysis section 174, the transmission device 101, and the reception device 102. The analysis section 174 of each organization makes an analysis by using the analysis information retained by the relevant organization. The concealment processing section 173 of each organization conceals the result of analysis performed by the analysis section 174 of the relevant organization. The transmission device 101 of each organization transmits the concealed analysis results to the analysis device 104 that is connected through the networks 103 and 105 and the Internet 106, which act as communication lines. The analysis device 104 includes the information transmission section 172, and transmits the concealed analysis results, which are transmitted from the transmission device 101 of each of the multiple organizations, to the other organizations. That is to say, the information transmission section 172 transmits, to any one or more of the multiple organizations, the information concealed, based on the level of credibility, by the concealment processing section 173 of any one of the multiple organizations at a concealment level that varies from one organization to another, and allows each organization to share the concealed information. The reception device 102 of each organization receives the concealed analysis results transmitted from the analysis device 104. Accordingly, it is possible to implement the information sharing system 1C that is able to achieve even more secure information sharing by allowing each organization to make an analysis based on its own analysis information, conceal the result of analysis, and share the concealed result of analysis with the other organizations.

Fifth Embodiment

The information sharing system according to a fifth embodiment of the present invention will now be described with reference to FIG. 22. The overall configuration of the information sharing system according to the fifth embodiment of the present invention is similar to the overall configuration of the information sharing system 1B according to the third embodiment, which is depicted in FIG. 17. Therefore, the fifth embodiment is described below with reference to the configuration of the information sharing system 1B depicted in FIG. 17.

The difference between the fifth embodiment and the third embodiment lies in the processing performed in a phase (step S1806 of FIG. 18, step S1906 of FIG. 19) in which the analysis device 104 transmits the concealed analysis information (concealed information) to each organization and allows each organization to share the concealed information. As described earlier, in the third embodiment, upon receiving the concealed information group and the credibility threshold information from the transmission device 101 of the organization A, the analysis device 104 uses the credibility table 184, the organization information table 182, and the received credibility threshold information to transmit the concealed information group, which has been provided from the organization A, to the organizations other than the organization A at a concealment level that varies with the level of credibility from the organization A to the other organizations. Meanwhile, the fifth embodiment will be described on the assumption that not only the level of credibility but also another index is used as a criterion for determining which organization is allowed to receive the analysis information and determining the level of concealment of such analysis information.

It is preferable that the above-mentioned index make it possible to determine, before the concealed analysis information is provided to each organization, whether it is worth providing the concealed analysis information to each organization. In the fifth embodiment, for example, the degree of similarity between the analysis information provided by the organization A and the analysis information retained by each organization is used as the above-mentioned index. In this instance, if the degree of similarity between the analysis information provided by the organization A and the analysis information originally retained by another organization is high, it is highly probable that the relevant organization has an issue common to the organization A and has analysis information highly related to the organization A. Therefore, when the index representing the degree of similarity between the relevant analysis information and the analysis information retained by each organization is introduced in a situation where the level of concealment of analysis information to be transmitted from the analysis device 104 to each organization is to be determined, it is possible to evaluate whether the above-mentioned related analysis information received by the organization A acting as an information provider from each organization, is highly likely to be beneficial to the organization A. If there is an organization that retains analysis information with a high degree of similarity, and the related analysis information fed back from the relevant organization to the organization A after the shared analysis information is provided to the relevant organization from the organization A is highly likely to be beneficial to the organization A, the organization A can allow the sharing of analysis information with a low level of concealment with the relevant organization in order to obtain a benefit even if the credibility to the relevant organization is somewhat low.

In a case, for example, where the organization A attempts to share information regarding a suspicious IP address with the other organizations B and C, the suspicious IP address list retained by the organization A is compared with the access logs of the organizations B and C to determine the degree of similarity between them. If, for example, the access log of the organization B has a high degree of similarity to the suspicious IP address list of the organization A, it signifies that the organization B receives many communications from access destinations common to the organization A. Therefore, it is highly probable that the related analysis information returned as feedback from the organization B in response to the provision of shared analysis information from the organization A will be useful to the organization A. Further, the information regarding a suspicious IP address that is provided from the organization A to the organizations B and C as the shared analysis information is useful information for the organization B, which retains information highly similar to such information regarding a suspicious IP address. Consequently, it is expected that the level of credibility between the organizations A and B will improve, and that they will share more beneficial information from next time on.

Figure 22:
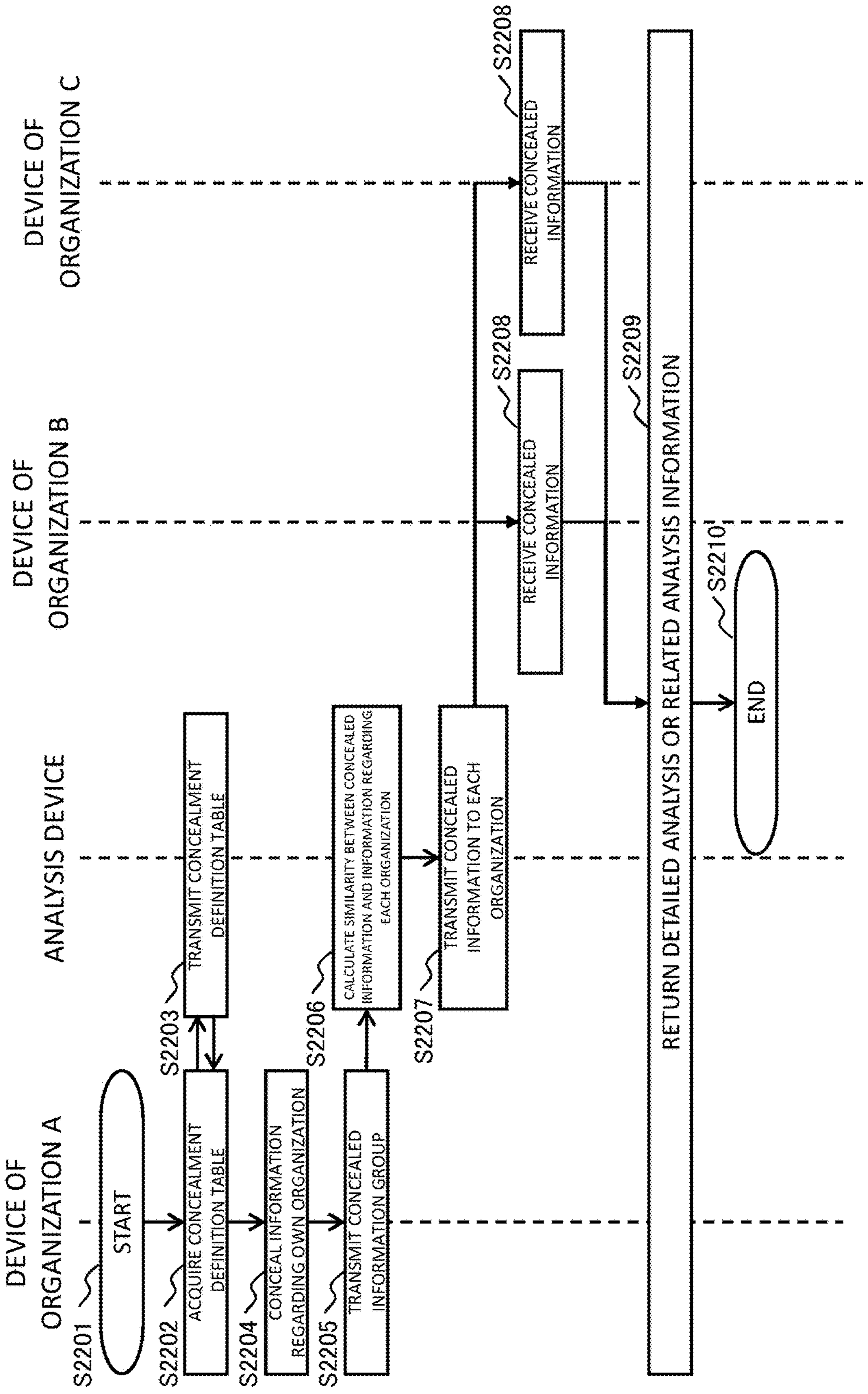
FIG. 22 is a flowchart illustrating an example of the overall process of the information sharing system according to a fifth embodiment of the present invention.

FIG. 22 is a flowchart illustrating an overall process of the information sharing system according to the fifth embodiment of the present invention. The processing in steps S2201 to S2205 is the same as the processing in steps S1801 to S1805 of FIG. 18 and the processing in steps S1901 to S1905 of FIG. 19.

When the concealed information group created in step S2204 and the credibility threshold information obtained by referencing the concealment policy 132 are received from the transmission device 101 of the organization A, the analysis device 104 causes the information transmission section 172 to search the organizations other than the organization A for information similar to the concealed information group received from the organization A. In this instance, for example, a well-known secret search technique capable of conducting a search while keeping the details of the search secret by encryption may be used to search for information similar to the analysis information. As a result, for an organization from which the information similar to the concealed information group is retrieved, the degree of similarity between these items of information is calculated (step S2206). In contrast, for an organization from which the information similar to the concealed information group is not retrieved, the degree of similarity is calculated as 0.

Next, by using the credibility table 184, the organization information table 182, the credibility threshold information received from the organization A, and the degree of similarity calculated in step S2206, the analysis device 104 causes the information transmission section 172 to divide the concealed information group, which is provided from the organization A, into pieces of analysis information (concealed information) that are concealed at a concealment level appropriate for the level of credibility from the organization A to the other organizations and for the degree of information similarity between the organization A and the other organizations, and transmit the resulting information to each organization other than the organization A as the shared analysis information provided by the organization A (step S2207). In this instance, whether the level of concealment based on the degree of similarity is to be adopted in accordance with the level of credibility may be determined. For example, for an organization that is judged to have low credibility, the determination is made by using the degree of similarity, and if the degree of similarity is judged to be high, the analysis information having a low concealment level (highly sensitive analysis information) is transmitted to such organization even if the credibility is low (step S2207). Further, in the above instance, as is the case with step S1011 of FIG. 10, which has been described in conjunction with the first embodiment, the analysis device 104 may transmit the concealed information to each organization in response to a request from the transmission device 101 of each organization instead of compulsorily transmitting the concealed information to each organization.

When the reception device 102 receives the concealed information (shared analysis information) transmitted from the analysis device 104 (step S2208), the organizations B and C may each view the received information and make an analysis in accordance with the determination made by each organization. Subsequently, the organizations B and C examine the received concealed information (shared analysis information) to determine whether it requires a more detailed analysis, and performs processing based on the result of determination (step S2209). In this case, if it is determined that a more detailed analysis is required, the organizations B and C perform the processing similar to the processing in steps S1808 to S1811 of FIG. 18. In contrast, if it is determined that the more detailed analysis is not required, and the shared related analysis information retained in the own organization is to be returned to the organization A, the organizations B and C perform the processing similar to the processing in steps S1908 to S1913 of FIG. 19.

According to the fifth embodiment of the present invention, which has been described above, the multiple organizations forming the information sharing system 1B each own the concealment processing section 173, the transmission device 101, and the reception device 102. The concealment processing section 173 of each organization collects and conceals the analysis information retained by the relevant organization. The transmission device 101 of each organization transmits the concealed analysis information to the analysis device 104 that is connected through the networks 103 and 105 and the Internet 106, which act as communication lines. The analysis device 104 includes the analysis section 174 and the information transmission section 172, collects the concealed analysis information by receiving the analysis information transmitted from the transmission device 101 of the multiple organizations, and transmits the concealed analysis information, which is collected from each organization, to the other organizations. The reception device 102 of each organization receives the concealed analysis information and analysis results, which are transmitted from the analysis device 104. Further, the information transmission section 172 calculates the degree of similarity between the analysis information concealed by the concealment processing section 173 of each organization and the analysis information owned by each of the multiple organizations, and transmits the concealed analysis information, which is concealed at a concealment level appropriate for the level of credibility and the degree of similarity, to any one or more of the multiple organizations. Accordingly, the information sharing system 1B is able to transmit the analysis information, which is provided from any one of the multiple organizations, to the other organizations at an appropriate concealment level. For example, even if the level of credibility from an organization providing the analysis information to an organization receiving the analysis information is low, the provided analysis information is compared with the analysis information retained by the organization that receives the provided analysis information, and then the degree of similarity between the compared items of analysis information is calculated. As a result, the multiple organizations are able to share information at a low concealment level and in an easier-to-use manner.

Moreover, as is the case with the third embodiment, each organization is able to determine, based on the shared analysis information concealed by the other organizations, whether an analysis is required, and if it is determined that the analysis is required, each organization is able to perform the analysis by using the analysis device 104. In contrast, even if it is determined that the analysis is not required, it is possible to implement an information sharing system that is able to provide feedback of the related information.

It should be noted that the present invention is not limited to the above-described embodiments and modifications, and can be implemented by using appropriate component elements without departing from the spirit and scope of the present invention. Further, the above-described embodiments and modifications can be implemented in any appropriate combination.

The above-described embodiments and modifications are merely examples, and the present invention is not limited to above-described embodiments and modifications as long as the characteristics of the present invention are not impaired. Furthermore, although various embodiments and modifications have been described above, the present invention is not limited to the above-described embodiments and modifications. Other aspects conceivable within the scope of the technical idea of the present invention are also included within the scope of the present invention.

REFERENCE SIGNS LIST

1, 1A, 1B, 1C: Information sharing system
101: Transmission device
102: Reception device
104: Analysis device
121: Request transmission section
122: Information transmission section
123: Analysis logic transmission section 131: Analysis logic
132: Concealment policy
151: Information search section
152: Analysis result evaluation section
171: Request transmission section
172: Information transmission section
173: Concealment processing section
174: Analysis section
175: Credibility update section
181: Logic information table
182: Organization information table
183: Credit score table
184: Credibility table
185: Concealment definition table

The invention claimed is:

1. An information sharing system comprising:

an analysis device comprising one or more processors and one or more memories storing instructions and storing a logic information table, an organization information table, a credibility table, and a concealment definition table, wherein the instructions, when executed by the one or more processors, cause the analysis device to:

receive, from a first organization, an analysis request identifying a requested analysis logic;

identify, from the logic information table, a second organization that owns the requested analysis logic and required information type for the requested analysis logic;

acquire the requested analysis logic from the second organization;

identify, from the organization information table, one or more information-providing organizations that own the required information type;

receive, from each information-providing organization, analysis information of the required information type and a concealment policy defining credibility thresholds for concealment levels of the required information type;

for the analysis information received from each information-providing organization, determine a directional credibility value from the information-providing organization to the first organization, determine a concealment level by comparing the directional credibility value with the credibility thresholds in the concealment policy, select a concealment operation from the concealment definition table based on the required information type and the determined concealment level, and generate concealed analysis information by applying the selected concealment operation;

execute the requested analysis logic using the concealed analysis information; and transmit a result of executing the requested analysis logic to at least the first organization.

2. The information sharing system according to claim 1, wherein the concealment policy defines, for the required information type, a first threshold between a low credibility concealment level and a medium credibility concealment level and a second threshold between the medium credibility concealment level and a high credibility concealment level.

3. The information sharing system according to claim 1, wherein the wherein applying the selected concealment operation comprises excluding the analysis information from use by the requested analysis logic when the selected concealment operation indicates that the analysis information is not to be shared.

4. The information sharing system according to claim 3, wherein the one or more processors are configured to withhold the result from an information-providing organization whose analysis information was excluded from use by the requested analysis logic.

5. The information sharing system according to claim 1, wherein the wherein the one or more processors are configured to generate the concealed analysis information before executing the requested analysis logic.

6. The information sharing system according to claim 1, wherein the logic information table further stores a level of concealment of information necessary for each analysis logic.

7. The information sharing system according to claim 1, wherein the one or more memories further store a credit score table, and wherein the one or more processors are configured to update the credibility table by normalizing credit scores stored in the credit score table.

8. The information sharing system according to claim 7, wherein the one or more processors are configured to increase a credit score from the first organization to the second organization in response to acquisition of the requested analysis logic from the second organization.

9. The information sharing system according to claim 7, wherein the the one or more processors are configured to update a credit score from the first organization to an information-providing organization based on at least one of whether the analysis information from the information-providing organization was used by the requested analysis logic or a degree of involvement of the analysis information in the result.

10. The information sharing system according to claim 7, wherein the the one or more processors are configured to receive, from a recipient organization receiving the result, evaluation information indicating at least one of usefulness of the result or leakage of the analysis information, and update a credit score from the recipient organization to the first organization based on the evaluation information.

11. The information sharing system according to claim 1, wherein the required information type includes forward proxy access log information, and the result identifies a suspicious connection destination IP address.

12. The information sharing system according to claim 1, wherein the one or more processors are further configured to calculate a degree of similarity between information received from a source organization and information owned by a candidate recipient organization, and to select a concealment level for information transmitted to the candidate recipient organization based on both a directional credibility value from the source organization to the candidate recipient organization and the degree of similarity.

13. The information sharing system according to claim 12, wherein the one or more processors are configured to calculate the degree of similarity using a secret search performed while details of the information received from the source organization are kept secret by encryption.

14. An information sharing method performed by one or more processors of an analysis device, the method comprising:

storing a logic information table associating analysis logics with owner organizations and required information types, an organization information table associating organizations with information types owned by the organizations, a credibility table storing directional credibility values for pairs of the organizations, and a concealment definition table associating combinations of information types and concealment levels with concealment operations;

receiving, from a first organization, an analysis request identifying a requested analysis logic;

identifying, from the logic information table, a second organization that owns the requested analysis logic and a required information type for the requested analysis logic;

acquiring the requested analysis logic from the second organization;

identifying, from the organization information table, one or more information-providing organizations that own the required information type;

receiving, from each information-providing organization, analysis information of the required information type and a concealment policy defining credibility thresholds for concealment levels of the required information type;

for the analysis information received from each information-providing organization, determining a directional credibility value from the information-providing organization to the first organization, determining a concealment level by comparing the directional credibility value with the credibility thresholds in the concealment policy, selecting a concealment operation from the concealment definition table based on the required information type and the determined concealment level, and generating concealed analysis information by applying the selected concealment operation;

executing the requested analysis logic using the concealed analysis information; and transmitting a result of executing the requested analysis logic to at least the first organization.

15. The information sharing method of claim 14, further comprising excluding the analysis information from use by the requested analysis logic when the selected concealment operation indicates that the analysis information is not to be shared, and withholding the result from an information-providing organization whose analysis information was excluded from use by the requested analysis logic.

* * * * *